US008430300B2

(12) United States Patent
Slavin et al.

(10) Patent No.: US 8,430,300 B2
(45) Date of Patent: Apr. 30, 2013

(54) USING VALIDITY EVENTS TO CONTROL THE USE OF COUPONS CONTAINING BARCODES IN MOBILE DEVICES THAT DISPLAY THE BARCODES FOR READING BY BARCODE READERS

(75) Inventors: Daniel Slavin, Belmont, MA (US); Pero Smrzlic, Danville, CA (US)

(73) Assignee: Codebroker, LLC, Belmont, MA (US)

( * ) Notice: Subject to any disclaimer, the term of this patent is extended or adjusted under 35 U.S.C. 154(b) by 457 days.

(21) Appl. No.: 11/765,096

(22) Filed: Jun. 19, 2007

(65) Prior Publication Data
US 2007/0241189 A1    Oct. 18, 2007

Related U.S. Application Data

(63) Continuation-in-part of application No. PCT/US2006/020659, filed on May 26, 2006, and a continuation-in-part of application No. PCT/US2007/010270, filed on Apr. 27, 2007.

(60) Provisional application No. 60/684,923, filed on May 26, 2005, provisional application No. 60/795,505, filed on Apr. 27, 2006, provisional application No. 60/814,861, filed on Jun. 19, 2006, provisional application No. 60/806,028, filed on Jun. 28, 2006, provisional application No. 60/807,278, filed on Jul. 13, 2006.

(51) Int. Cl.
*G06F 17/00* (2006.01)
(52) U.S. Cl.
USPC ........................................ 235/375; 235/487
(58) Field of Classification Search ............. 235/414, 235/383, 375, 487; 705/14
See application file for complete search history.

(56) References Cited

U.S. PATENT DOCUMENTS 5,512,739 A    4/1996  Chandler et al.
5,979,768 A    11/1999 Koenck
(Continued)

FOREIGN PATENT DOCUMENTS

WO  2006/128094 A1  11/2006
WO  2007/127385 A2  11/2007

OTHER PUBLICATIONS

Final Office Action, received in U.S. Appl. No. 12/296,329, mailed on Dec. 19, 2011, 16 pages.
(Continued)

*Primary Examiner* — Thien M Le
*Assistant Examiner* — Sonji Johnson
(74) *Attorney, Agent, or Firm* — Patent GC LLC; Kenneth F. Kozik; Michelle Rosenberg

(57) ABSTRACT

Technique for ensuring that a device that contains coupons with barcodes will not output a barcode belonging to an invalid coupon to a barcode reading system. The technique avoids validation of the coupon at the time the barcode is provided to the barcode reading system. In the technique, the mobile device responds to a validity event that may affect the validity of a given coupon by inhibiting the provision of the given coupon's barcode to the barcode reading system until the coupon has been validated on the basis of validity information available in the device that is outputting the barcode, and then again permitting the given coupon's barcode to be output to the barcode reading system. In applications of the technique, the coupon may be used n times, the coupon may be shared, or the coupon may become valid after a set of actions have occurred.

33 Claims, 17 Drawing Sheets

U.S. PATENT DOCUMENTS

| | | | |
|---|---|---|---|
| 6,034,379 | A | 3/2000 | Bunte et al. |
| 6,094,509 | A | 7/2000 | Zheng et al. |
| 6,313,732 | B1* | 11/2001 | DeLuca et al. .................. 340/7.2 |
| 6,446,868 | B1 | 9/2002 | Robertson et al. |
| 6,494,375 | B1 | 12/2002 | Ishibashi et al. |
| 6,565,003 | B1 | 5/2003 | Ma |
| 6,631,840 | B1 | 10/2003 | Muramatsu et al. |
| 6,708,884 | B1 | 3/2004 | Su et al. |
| 6,862,575 | B1* | 3/2005 | Anttila et al. .............. 705/14.14 |
| 6,997,384 | B2 | 2/2006 | Hara |
| 7,108,187 | B2 | 9/2006 | Turvy, Jr. et al. |
| 7,121,469 | B2 | 10/2006 | Dorai et al. |
| 7,181,066 | B1 | 2/2007 | Wagman et al. |
| 7,270,273 | B2 | 9/2007 | Barber et al. |
| 7,428,079 | B2 | 9/2008 | Barber et al. |
| 7,603,320 | B1 | 10/2009 | Shu |
| 2002/0091569 | A1* | 7/2002 | Kitaura et al. .................. 705/14 |
| 2003/0066883 | A1 | 4/2003 | Yu |
| 2003/0074259 | A1* | 4/2003 | Slyman et al. .................. 705/14 |
| 2003/0115152 | A1* | 6/2003 | Flaherty .......................... 705/65 |
| 2003/0144035 | A1* | 7/2003 | Weinblatt et al. ............. 455/566 |
| 2004/0011872 | A1 | 1/2004 | Shimizu |
| 2004/0012569 | A1 | 1/2004 | Hara |
| 2004/0019792 | A1 | 1/2004 | Funamoto et al. |
| 2004/0026508 | A1 | 2/2004 | Nakajima et al. |
| 2004/0039919 | A1 | 2/2004 | Takayama et al. |
| 2004/0099741 | A1 | 5/2004 | Dorai et al. |
| 2004/0195332 | A1 | 10/2004 | Barber et al. |
| 2005/0131761 | A1* | 6/2005 | Trika et al. ....................... 705/14 |
| 2005/0167504 | A1 | 8/2005 | Meier et al. |
| 2005/0237204 | A1 | 10/2005 | Burman et al. |
| 2006/0064600 | A1 | 3/2006 | Polichetti et al. |
| 2006/0165060 | A1 | 7/2006 | Dua |
| 2007/0168943 | A1 | 7/2007 | Marini et al. |
| 2007/0204025 | A1* | 8/2007 | Cox et al. ...................... 709/223 |
| 2008/0162497 | A1 | 7/2008 | Lim |
| 2008/0210754 | A1 | 9/2008 | Lovett |
| 2009/0006254 | A1 | 1/2009 | Mumm et al. |

OTHER PUBLICATIONS

Final Office Action, received in U.S. Appl. No. 12/371,130, mailed on Nov. 25, 2011, 14 pages.

International Preliminary Report on Patentablity, received in International PCT Application No. PCTUS2006020659, mailed on Jul. 6, 2007, 3 pages.

International Preliminary Report on Patentablity, received in International PCT Application No. PCTUS2007010270, mailed on Oct. 28, 2008, 6 pages.

International Search Report and Written Opinion, received in International PCT Application No. PCTUS2006020659, mailed on Sep. 20, 2006, 4 pages.

International Search Report and Written Opinion, received in International PCT Application No. PCTUS2007010270, mailed on Jul. 3, 2008, 6 pages.

Non Final Office Action, received in U.S. Appl. No. 12/296,329, mailed on Jul. 21, 2011, 14 pages.

Non Final Office Action, received in U.S. Appl. No. 12/371,130, mailed on Feb. 18, 2011, 7 pages.

Non Final Office Action, received in U.S. Appl. No. 12/371,130, mailed on May 25, 2012, 12 pages.

* cited by examiner

Token-Only Package

1502

Package with Token and a standard Barcode coupon

1504

Package with Token and SuperCoupon Barcode

1506

Barcode Manipulations

1602

1604

1606

1608

1610

1611

1612

1614

1600

1700  Sample Optimization for Data Matrix Barcode with Data "DataMatrix ECC200"

1702

20 x 20 can carry a maximum of 20 bytes of data

1704

12 x 36 can carry a maximum of 20 bytes of data

1706

12 x 36 rotated 90 degrees can carry a maximum of 20 bytes of data

1708

Shorter than 20 x 20

Narrower than 12 x 36

1710

Shorter than 12 x 36

Narrower than 20 x 20

USING VALIDITY EVENTS TO CONTROL THE USE OF COUPONS CONTAINING BARCODES IN MOBILE DEVICES THAT DISPLAY THE BARCODES FOR READING BY BARCODE READERS

CROSS REFERENCE TO RELATED APPLICATIONS

The present patent application is a continuation-in-part of PCT/US2006/020659, Slavin, et al., Checking validity of barcodes in mobile devices that display the barcodes for reading by barcode readers, filed May 26, 2006. PCT/US2006/020659 claims priority from U.S. provisional patent application 60/684,923, Dan Slavin, Using wireless devices to display barcodes, filed May 26, 2005. PCT/US2006/020659 and 60/684,923 are incorporated into the present patent application by reference for all purposes and the present application contains the complete Detailed Description of PCT/US2006/020659. The present patent application is also a continuation-in-part of PCT/US2007/010270, Slavin, et al., Customizing barcode images for particular displays, filed 27 Apr. 2007 and claiming priority from U.S. provisional patent application 60/795,505, Slavin, et al., Customizing Bar Code Images for Particular Displays, filed Apr. 27, 2006. PCT/US2007/010720 and 60/795,505 are incorporated into the present patent application by reference for all purposes. The section Controlled electronic coupon sharing of the present application contains a portion of the Detailed Description of PCT/US2007/010270.

The present patent application further claims priority from three provisional patent applications:
- 60/814,861, Slavin, et al., Controlled electronic coupon sharing, filed Jun. 19, 2006;
- 60/806,028, Slavin, et al., Controlled electronic coupon sharing, filed Jun. 28, 2006; and
- 60/807,278, Slavin, et al., Making an electronic coupon redeemable in response to a sequence of end user behaviors, filed Jul. 13, 2006.

Each of these applications is incorporated by reference for all purposes into the present patent application. The new material in the Detailed Description of this CIP begins with the section entitled Controlled electronic coupon sharing.

BACKGROUND OF THE INVENTION

1. Field of the Invention

The present invention relates to systems in which transactions are performed by displaying a barcode on a mobile device such as a cellular telephone and using a barcode reader to read the displayed barcode.

2. Description of Related Art

Manufacturers, retailers, event venues, and clubs have long used printed coupons, rebates, tickets, and membership cards with barcode representations to deliver discounts, tickets, and membership information to consumers.

Coupons have typically been delivered by direct mail, or as an insert in a newspaper, or even via in-store displays that contain printed coupons for use by customers. More recently, online coupon centers have been established which allow a customer to electronically find coupons (using a computer) and print them for use in the store (or in conjunction with online purchases).

Even more recently, people have begun delivering electronic coupons containing barcodes to mobile devices for a variety of uses, see for example PCT/GB2003/004131, Forbes, Optimized messages containing barcode information for mobile receiving device, published as WO2004/027662. As employed herein, an electronic coupon may be any collection of information that is identified by a barcode. Electronic coupons offer advantages for both end users and coupon issuers. Because the coupons are electronic, they are much cheaper to issue than paper coupons. Further, the fact that the mobile device can both provide and receive information about the coupon permits kinds of coupons that have no paper coupon equivalents. For example, an electronic coupon may be an n use coupon, that is, a coupon that can be used a predetermined number of times. For the end user, finally, the end user's mobile device doubles as a coupon carrier.

A major problem with electronic coupons is checking the coupon's validity. With paper coupons, validity checking is done by the clerk at the point of sale system. With a standard paper coupon, for example, the clerk at the point of sale checks the coupon to make sure it hasn't expired, passes the coupon's barcode across the barcode reader until the barcode reader confirms that the code has been read, and retains the coupon, thereby ensuring that the coupon is valid when used and used only once. Because the clerk does the validity checking in standard point of sale systems, standard point of sale systems are not set up to deal with invalid coupons. Thus, an important advantage of using mobile devices to display coupons is that the mobile device can do the validity checking. This permits the use of electronic coupons at clerkless point of sale systems and also permits new kinds of coupons such as the n-use coupon described above. Further, because the mobile device has both local and remote information about the coupon and the reading process available to it, it provides a channel for feedback about the coupon generally.

Prior art describes solutions for the validity problem that require the mobile device to contact a central server as part of the process of displaying the coupon's barcode on the mobile device. If the server indicates that the coupon is invalid, the mobile device will not display the barcode. Another method is to provide feedback to a central server in the point of sale system, as disclosed in PCT/GB2003/004131. Disadvantages of these solutions include the following:
- They are too slow for use during the standard retail store checkout process.
- If the mobile device is not connected to a network at the time the barcode is to be presented, then these solutions are not viable.
- If the central server is inoperable at the time the barcode is to be presented, then this solution is not viable.
- If the network response time is too slow, then the end user may become frustrated while waiting for the central server to respond and the solution is not viable.

PCT/US2006/020659 discloses solutions to the foregoing problems. The solutions all involve using the intelligence in the mobile device to respond to validity events. Further work with the techniques disclosed in PCT/US2006/020659 has led to a better understanding of the significance of validity events and to the development of new kinds of coupons that take advantage of the fact that the mobile device can respond to validity events. The new kinds of coupons include:
- Coupons which can be shared with another person in a controlled manner.
- Supercoupons in which the validity of the super coupon depends upon the performance of a sequence of acts by the recipient of the coupon; and

SUMMARY OF THE INVENTION

The problem of determining the validity of an electronic coupon in the device which outputs the electronic coupon's barcode for reading by a barcode reading device is solved by a method of ensuring that a given electronic coupon is valid for a particular kind of use which includes the steps performed in the device which outputs the electronic coupon's barcode of responding to a validity event which may affect the validity of a given electronic coupon for the particular kind of use by inhibiting output of the barcode belonging to the given electronic coupon for the particular kind of use;

determining on the basis of validity information which is available in the device prior to the validity event whether the given electronic coupon is currently valid for the particular kind of use; and if the given electronic coupon is currently valid for the particular kind of use, permitting output of the given electronic coupon's barcode for the particular kind of use. The device which outputs the barcodes may be a mobile device and the barcode may be displayed on a display belonging to the mobile device. The device may also be a non-mobile device such as a PC.

The foregoing technique may be used to create electronic coupons which may be used n times, to create electronic coupons that may be shared with other devices that output electronic coupons for reading by a barcode reading device, and to create electronic coupons which become valid after all of the events in a predetermined set of events have occurred.

Other objects and advantages will be apparent to those skilled in the arts to which the invention pertains upon perusal of the following Detailed Description and drawing, wherein:

Figure 1:
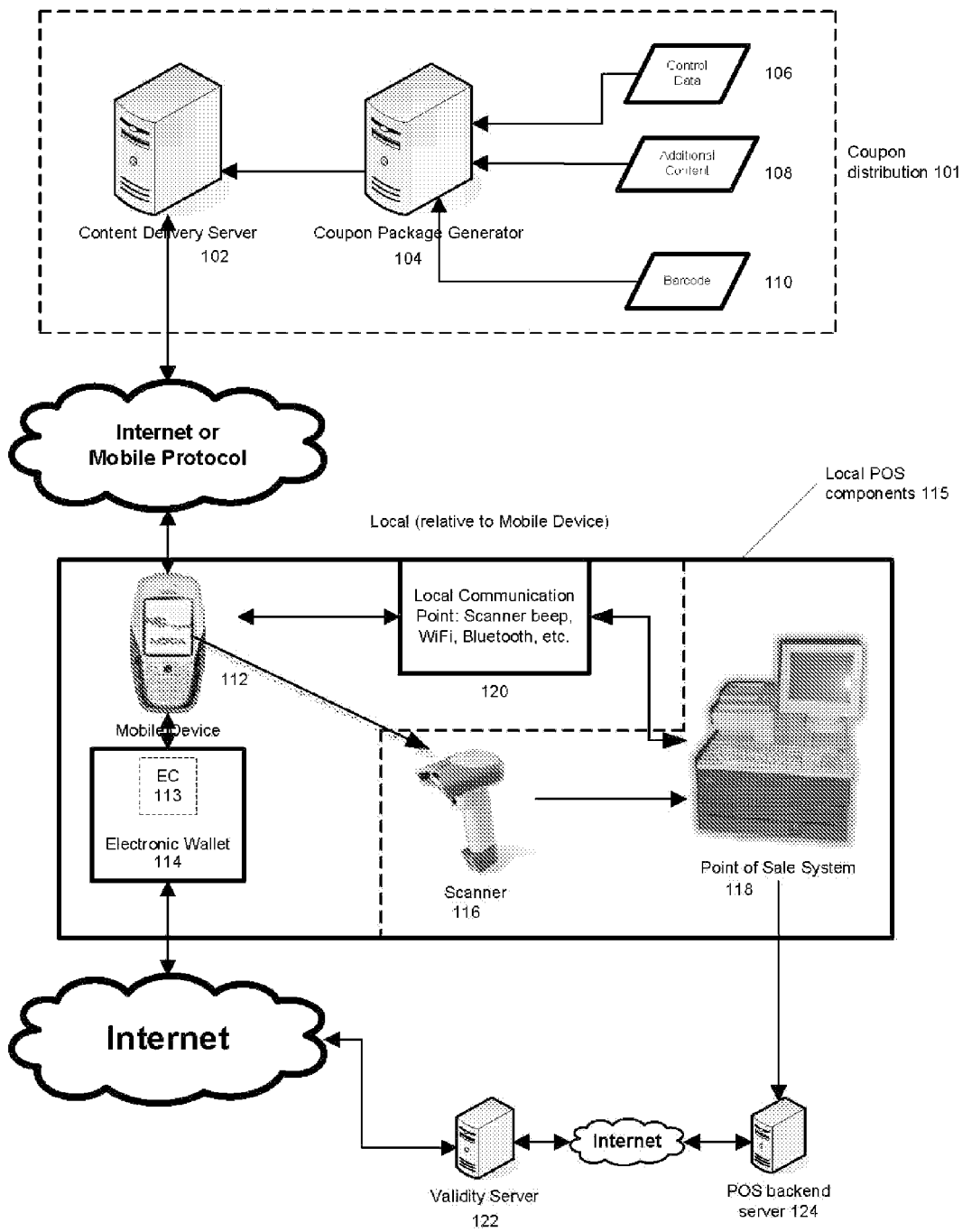
FIG. 1 is an overview of a system in which the techniques of the invention are employed.

In the reference numbers employed in the Drawing and Specification, the rightmost two digits are a reference number within a figure; the remaining digits are the figure number. Thus, the item referred to by the reference number 204 will be found in FIG. 2.

DETAILED DESCRIPTION OF THE INVENTION

The following Detailed Description contains the entire Detailed Description of PCT/US2006/020659 as well as the complete FIGS. 1-7 of that application. The new material begins with FIG. 8 and the section titled *Controlled electronic coupon sharing*.

Overview of the Invention

FIG. 1 illustrates, in schematic form, a system 100 for using a mobile device to provide a barcode from an electronic coupon whose validity is known to a point of sale system. In the following, a barcode is to be understood to include any representation of the information in the barcode itself, including the barcode's image and alphanumeric representations of the image. A point of sale system is understood to include any system which is capable of reading the information in the barcode. The main components of system 100 are coupon distribution system 101, a mobile device 112 such as a cellular telephone or a PDA, the local components 115 of a point of sale (POS) system 118 that can scan barcodes, a point of sale backend server 124 from which information about transactions performed by the POS system may be obtained, and a validity server 122, which collects and maintains information relevant to the validity of electronic coupons. In some embodiments, the functions of backend server 124 and validity server 122 may be combined in a single server. In many cases, the entity that provides the coupons and determines their validity will be different from the entity that is using the coupons to promote a product or service. In such cases, the coupon distribution and validity server components of the system would belong to the entity that provides the coupons.

Beginning with coupon distribution system 101, coupon distribution system 101 distributes electronic coupons to mobile devices. The coupons may be distributed in response to a request from the mobile device or from a user of the mobile device who makes the request via the Internet, or can even be distributed as unsolicited messages to the mobile device. When a coupon is to be distributed, coupon package generator 104 will generate an electronic package that represents the electronic coupon. The electronic package is then sent to the Content Delivery Server 102. The electronic package may contain the following:

i) the coupon's barcode 110; the barcode may be a display-ready image of the barcode or information from which a display of the barcode may be generated or the information contained in the barcode may be provided.

ii) some Control Data 106. In the present context, the most important part of control data 106 is the validity information for the electronic coupon. Examples of validity information include but are not limited to the following:

The number of times a coupon may be used;

The date on which the coupon expires;

Locations at which the coupon may be used; and a network location from which validity information about the coupon may be obtained.

Control data 106 may also contain information that governs how the validity of the coupon is to be checked, for example, the number of retries to be made if the validity is to be checked using information from the network location and information about how long the barcode is to be displayed.

iii) optionally Additional Content 108 for the coupon may include text or multimedia content.

A message is then sent to the mobile device via a message format such as SMS. Any other available messaging technique may of course be used. The message may include a URL link to the package which was created. The user then clicks on this link and the package is downloaded to the mobile device 112. In mobile device 112, the electronic coupon, represented by box 113, is manipulated by electronic wallet software 114. Among the tasks performed by electronic wallet software 114 are determining whether a given electronic coupon is valid and if it is, communicating the electronic coupon to the local point of sale system 116. In some embodiments, the wallet may communicate the coupon to the local point of sale system 116 by displaying the coupon's barcode on the mobile device's display screen so that the barcode can be read by scanner 116; in others, it may use a wireless link in local communication point 120 to provide the barcode to point of sale system 118.

When the coupon is displayed or otherwise provided to point of sale system 118, mobile device 112 may receive immediate confirmation that point of sale system 118 has successfully read the barcode. The confirmation may come in any of a number of ways, for example, via a "beep" from point of sale system 118 that is detected in mobile device 112, via messages sent and received via local communication point 120, or by having the user push a button on mobile device 112 when he or she believes that point of sale system 118 has read the barcode. If no such immediate confirmation is received, mobile device 118 may obtain validity information from validity server 122 that confirms the successful read.

Once the barcode has been read, point of sale system 118 treats it like any other barcode: it is used as necessary in the transaction being performed by the point of sale system and it is sent to a backend server belonging to the point of sale system so that the use of the coupon can be recorded. In the case of the electronic coupons 113 of system 100, if the use of the coupon affects the coupon's validity, backend server 124 reports use of the coupon to validity server 122, which may simply record the use or may itself determine whether the use has rendered the coupon invalid.

Figure 7:
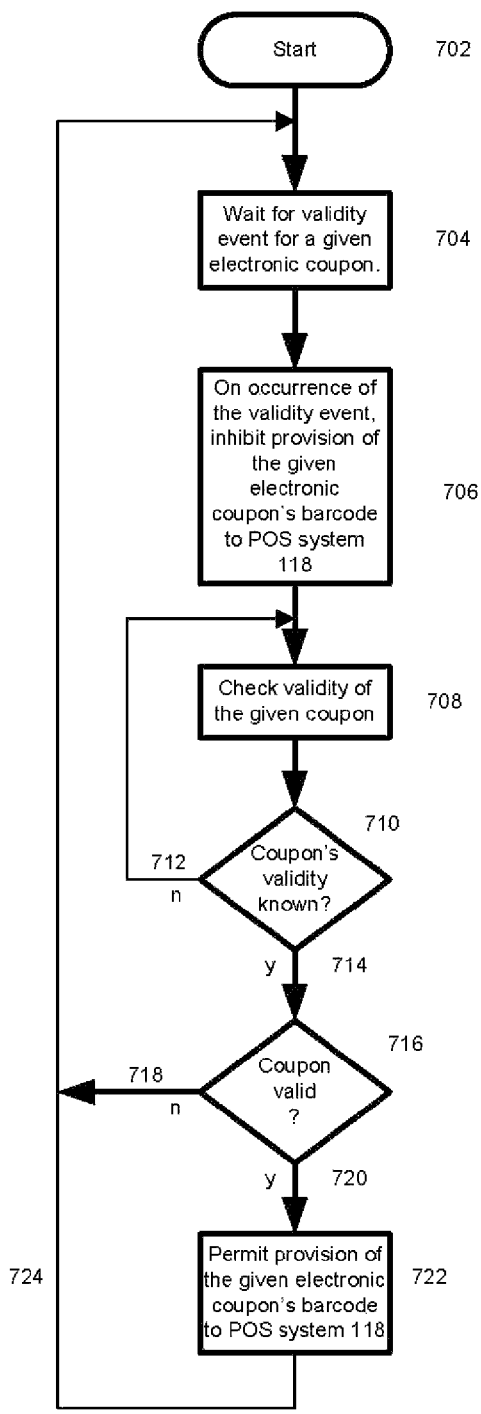
FIG. 7 is a flowchart of the manner in which the wallet responds to a validity event.

Returning to electronic wallet 114, electronic wallet 114 will only communicate an electronic coupon 113's barcode to point of sale system 118 if electronic wallet 114 has been able to determine that the electronic coupon is currently valid. Electronic wallet 114 makes a validity determination for a given electronic coupon in response to any validity event known to electronic wallet 114. A validity event is any event which may affect the validity of the given electronic coupon. FIG. 7 is a flowchart 700 of how wallet 114 responds to a validity event. Beginning at start 702, the wallet waits for a validity event for a given electronic coupon (704). When the event occurs, the wallet inhibits provision of the given electronic coupon's barcode to POS system 118 (706). At 708, the wallet checks whether the given coupon is currently valid. If the coupon's validity is known, i.e., if the wallet can determine the coupon's validity from the validity information it has and/or whatever validity information may be available via local communication point 120 from point of sale system 118 or via the network from validity server 122, branch 714 is taken; otherwise, branch 712 is taken. Loop 712 continues attempting to check the validity of the given coupon, with the intervals between attempts and the number of attempts made before the wallet gives up being determined from information in control data 106.

In branch 714, if the coupon is valid (716, 720, 722), the wallet again permits the coupon's barcode to be provided to POS system 118. If the coupon is not valid, the wallet continues to inhibit provision of the barcode to POS system 118 until the coupon is removed from the wallet or another validity event renders the coupon valid again.

Examples of validity events include but are not limited to providing the barcode to the POS system;
reaching the expiration date of the coupon;
providing the barcode at a particular location; and
receiving information which defines or redefines the coupon's validity, for example, new control data for a coupon.

In most cases, electronic wallet 114 can make a validity determination in response to a validity event at a time other than the moment the user selects to redeem the coupon, and consequently, validation may be separated from redemption and the redemption process need not be burdened by the time required for the validation process. Electronic wallet 114 may also provide validity information to validity server 122. Validity information from electronic wallet 114 may further be used to check the validity information in validity server 122 or vice-versa.

The information required for a validity event and the source of the information depend of course on the validity event. For example, mobile devices have clocks, and consequently, whether a time-related validity event has occurred can be determined by examining an electronic coupon's validity information and the time currently indicated by the mobile device's clock. With a location-related validity event, the coupon's validity information can contain a set of codes for valid locations and the user can input the code for the location where he or she is intending to provide the coupon to the barcode reading system to the mobile device. If the location code does not match one of the codes in the set, the mobile device will not provide the barcode to the barcode reading system. Some mobile devices are of course aware of where they are, and in such mobile devices, the mobile device can check whether its current location is one of the permitted locations.

Figure 6:
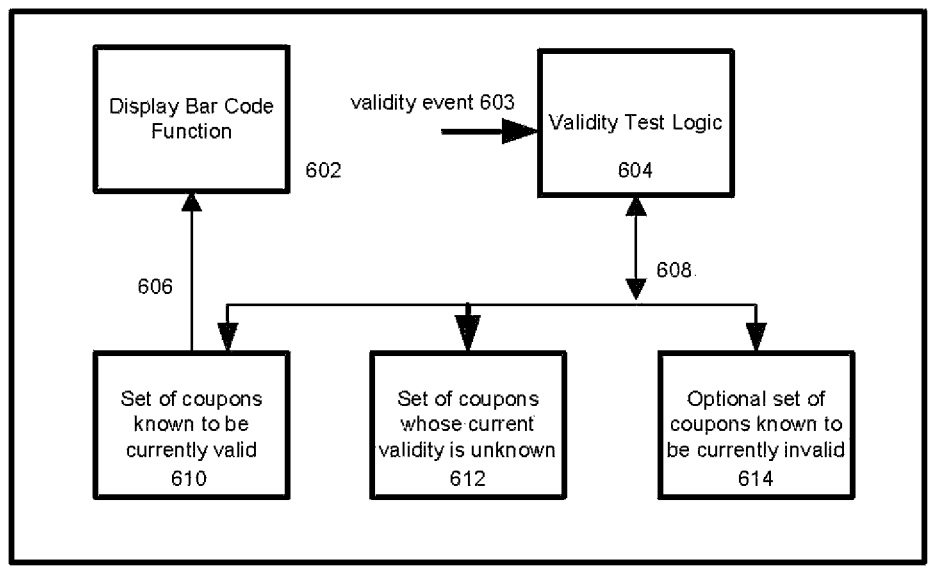
FIG. 6 is a block diagram of the wallet components.

The Wallet and the Validate—Display for Reading—Revalidate cycle: FIG. 6

FIG. 6 is a detailed block diagram of electronic wallet application program 114. When the mobile device opens the package representing electronic coupon 113, the MIME type associated with the package opens electronic wallet application 114 and provides the coupon's barcode, Control Data, and Additional Data to wallet application 114.

If the user does not have a previously installed electronic wallet 114 on his/her mobile device, then another link contained in the SMS message will allow him/her to download and install electronic wallet 114 on the mobile device prior to downloading the package representing electronic coupon 113.

Electronic wallet 114 contains 5 major components:
1) A set 610 of coupons that are known by the wallet to be currently valid
2) A set 612 of coupons whose current validity is not known to the wallet;
3) An optional set 614 of coupons which are known to be currently invalid;
4) Validity test logic 604 which responds to a validity event 603 by determining which set of coupons a given coupon currently belongs to; and
5) a program 602 that displays barcodes belonging to the set of coupons that are known to be currently valid in a form that a barcode scanner can read. Where local communications link 120 is used to provide the barcode to point of sale system 118, the program 602 provides the barcodes via communications link 120.

The sets of coupons may be implemented using any technique that divides the coupons into three distinct groups. Example implementations are flags associated with the coupons that indicate which of the sets a particular coupon belongs to and a linked list for each set of coupons.

When a coupon is placed into the wallet for the first time, it is placed in the set 612 of coupons whose validity is unknown.

This is the first validity event 603 for the coupon. The wallet responds to validity event 603 by checking the validity of the coupon. The validity check is done using the validity information for the coupon that is contained in control data 106. In some cases, the check may involve validity server 122. If the checks indicate that the coupon is valid, wallet 114 places the coupon in set 610 of coupons known to be valid.

Indicating to the Portable Device that the Barcode was Read

At this point, the barcode may be displayed by the end user only from wallet 114 and only by display barcode function 602. This operation will only initiate the display of barcodes from coupons belonging to set 610 of coupons which the wallet knows to be valid. Execution of display barcode function 602 is a validity event. Operation 602 is the only operation that displays the actual barcode in readable form on the mobile device. In the case of implementations in which the barcode is provided to point of sale system 118 by communications link 120, only operation 602 will provide the barcode to the point of sale system.

When the user wishes to present the coupon, s/he can then access this coupon by running the wallet application and selecting the particular coupon for display from set 610 of coupons known to be valid. This causes display barcode function 602 to be executed. When the user executes this operation, mobile device 112 displays the barcode to the barcode reader for scanning as shown in FIG. 1. Because the execution is a validity event 603, validity test logic 604 will move the coupon into the set 612 of coupons whose validity is unknown. The coupon will remain in set 612 until validity test logic 604 has determined its validity. Where validity is conditioned on a successful read of the barcode (as is the case, for example, with n-use coupons), validity test logic 604 will use a confirmation from point of sale system 118 in the validity check if the confirmation is available; otherwise, it will obtain information that confirms that the read was successful from validity server 122, as shown in flowchart 300 in FIG. 3. At 302, the barcode displayed by mobile device 112 is scanned; if the scan is not successful (304), it is repeated (306); if it is successful, success is indicated locally by one or more of the mechanisms:

1) Generating a beep to acknowledge an accurate read (308)
2) Confirming the read via a signal sent to the mobile device by a communication method such as Bluetooth and a protocol such as Object Exchange (OBEX) (310).
3) Sending a notification to POS backend server 124 (312) indicating that the barcode has been successfully read, from whence a notification that the barcode has been redeemed is sent to validity server 122 (314).

Figure 2:
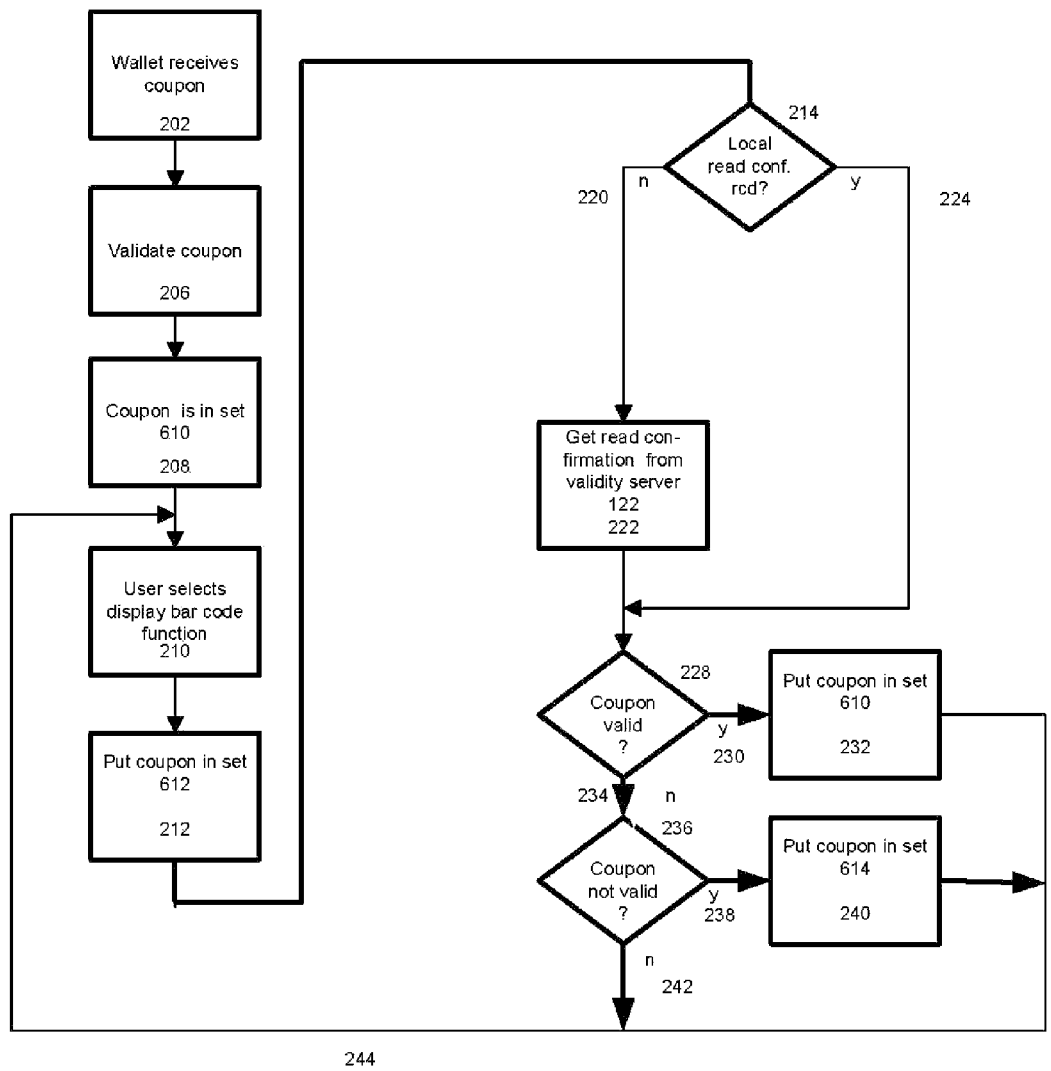
FIG. 2 details the Validate/Re-validate cycle.
Figure 3:
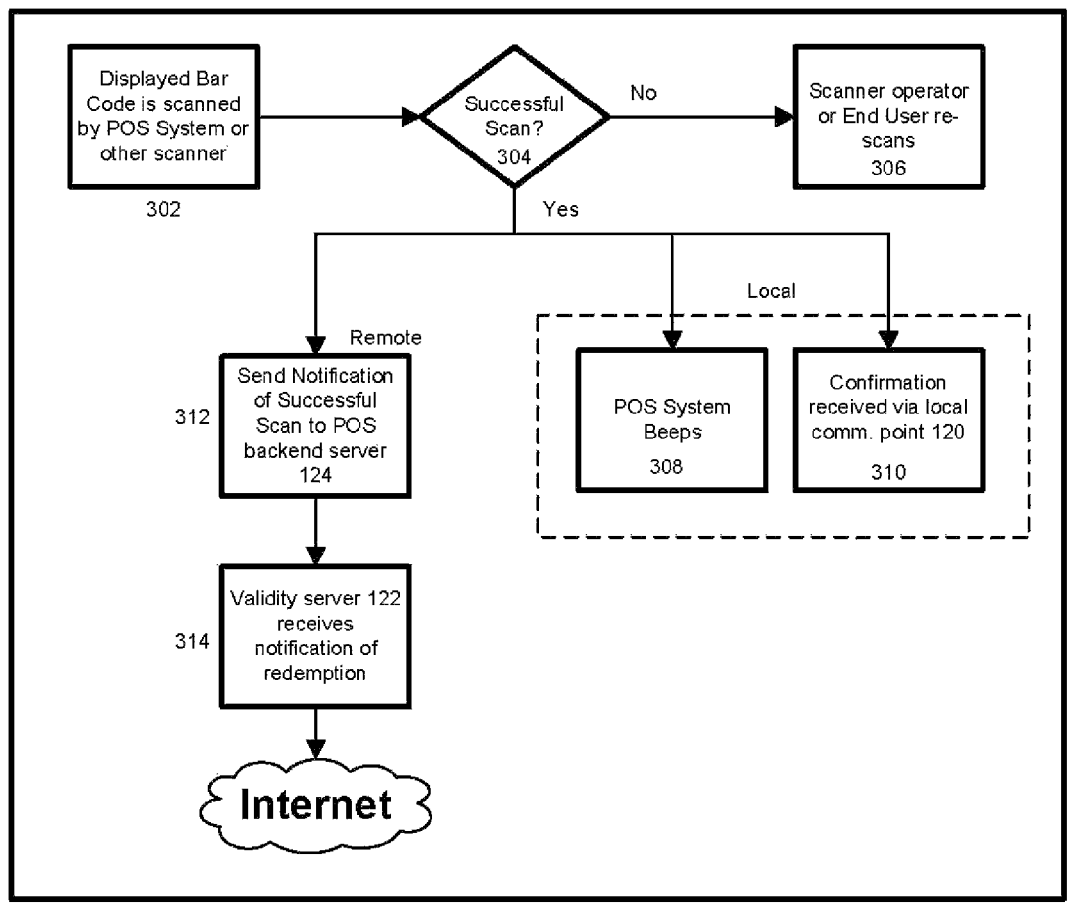
FIG. 3 details the Point of Sale system scan and confirm process.

Revalidation of the Coupon: FIG. 2

FIG. 2 is a flowchart 200 of how a coupon is validated when it is first put into wallet 114 and validated again in response to a provision of the coupon's barcode to point of sale system 118. In the latter case, the validation event is the provision of the coupon's barcode to the point of sale system. This validation event is relevant to n-use coupons. Each display and successful read of the coupon represents a use of the coupon. At 202, wallet 114 receives the coupon; this is a validity event 603, so at 206, validity test logic 604 first places the new coupon in set 612 and then checks the current validity of the coupon using information in control data 106 and/or information received from validity server 122 and places the coupon in set 610, 612, or 614 as required by the results of the validity check. If the coupon is in set 612, validity test logic 604 may attempt validation again later. In some embodiments, the downloaded coupon may be assumed to be valid, in which case, step 206 would be omitted and the coupon would be immediately placed in set 610. Assuming the coupon is in set 610, as shown at 208, display barcode function 602 displays the barcode (210). This is the barcode display validity event, so the function places the coupon in set 612. The information required for the validity check for this second validity event is whether the barcode was read by point of sale system 118. Wallet 114 may determine whether the barcode was read either on the basis of information obtained locally from point of sale system 118 or from validity server 122. As shown at 214, if wallet 114 is able to obtain a read confirmation locally, branch 224 is taken; otherwise, branch 220 is taken.

Wallet 114 may receive local confirmation that the barcode was read in at least the following ways:

via wireless link 120;
by detecting the "beep" produced by point of sale system 118 when the code is read;
by detecting depression of a button that the user pushes when the user hears the "beep".

if no local read confirmation is received (220), validation must be done using information from validity server 122, as shown at 222. If local read confirmation is received (224), validation at 228 may be done on the basis of the read confirmation; otherwise it is done using the validity information from validity server 122. If the coupon is still valid, the validity test logic restores it to the set 610 of coupons known to be currently valid (228, 232); if it is invalid, the validity test logic moves it to the set of coupons 614 known to be currently invalid (238, 240) or simply discards the electronic coupon. If the validity test logic cannot determine whether the coupon is valid or invalid (236,242), it remains in the set 612 of coupons whose current validity is unknown. Loop 244 is repeated each time a user selects display barcode function 602.

The revalidation may involve only information available in the wallet, may involve information obtained from point of sale system 118, may involve contacting validity server 122 for current validity information about the coupon the barcode belongs to, or may involve information from a combination of these sources. For example, if the display barcode function has received local confirmation that the barcode has been read and provides the confirmation to validity test logic 604 (226), validity test logic 604 can use that information to determine whether the coupon is still valid. If there is no local confirmation that the barcode has been read, validity test logic 604 can wait for a period of time which permits the information that the barcode has been read to propagate from point of sale system 118 via POS backend server 124 to validity server 122 and then can obtain the information from validity server 122 (222). The wait period may be part of control data 106 or the validity test logic may determine the wait based on its experience with the length of time it takes for information belonging to a given class of coupon to be propagated to validity server 122. It should be noted here that because validity server 122 provides a source of validity information which is independent of the POS system, validity test logic 604 may check the validity of coupons in wallet 114 at any time, not just when the coupon is first received in electronic wallet 114 or when the coupon has been communicated to the POS system.

Where server 122 is being contacted, the wallet may periodically retry the process for the time period specified in the coupons Control Data 106. The retries will be stopped once one of the following three conditions is met:

1) The electronic wallet is able to successfully contact validity server 122 and receive information from which the electronic wallet can determine the coupon's validity.

2) The electronic wallet fails to contact validity server 122 during the period of time specified in Control Data 106.
3) The electronic wallet fails to receive information from validity server 122 which the electronic wallet can use to determine the validity of the coupon during the period of time specified in Control Data 106.

Figure 4:
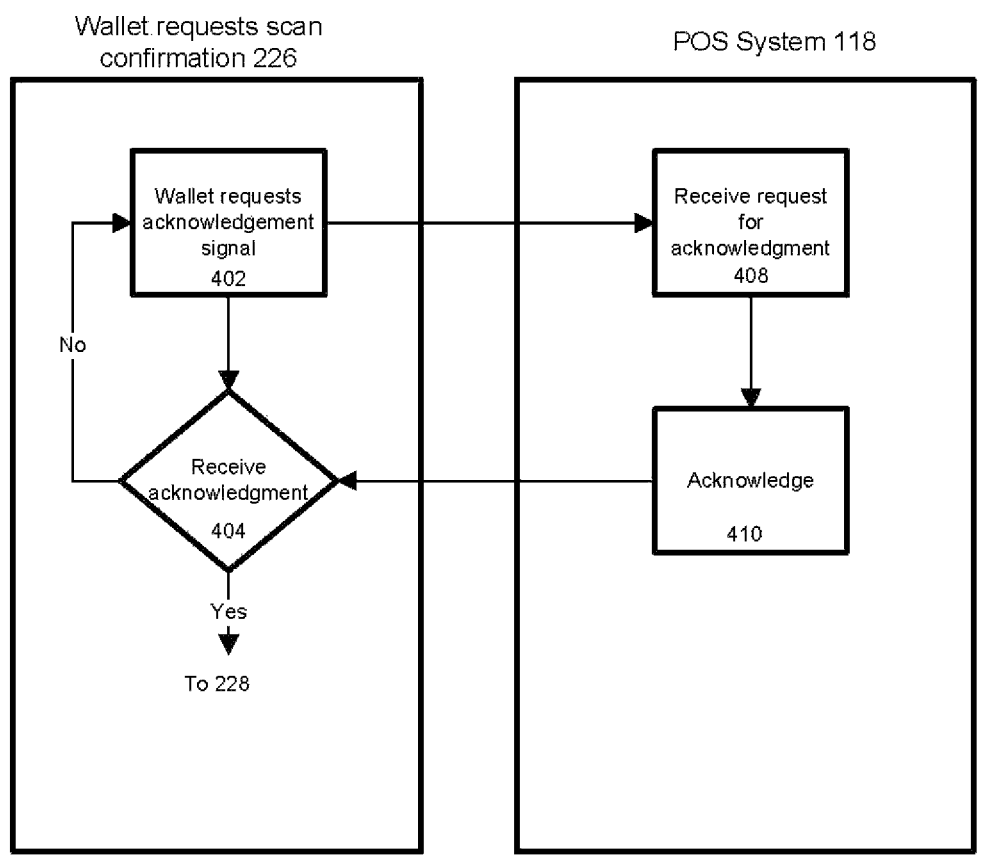
FIG. 4 details the Local Re-validation process.

FIG. 4 presents at 400 details of how validity information is obtained from POS 118 when mobile device 112 has a Bluetooth link to POS 118. After display barcode function 602 has provided the barcode to point of sale system 118 and put the barcode's coupon into set 612, validity test logic 604 requests an acknowledgment signal from POS system 118 that POS system 118 has read the barcode (402). POS system 118 receives the request at 408 and provides the signal at 410. If the validity test logic does not receive the acknowledgment, it tries again for a limited number of times. Otherwise, it uses the acknowledgment to determine whether the coupon is still valid at decision block 228 of FIG. 2.

Figure 5:
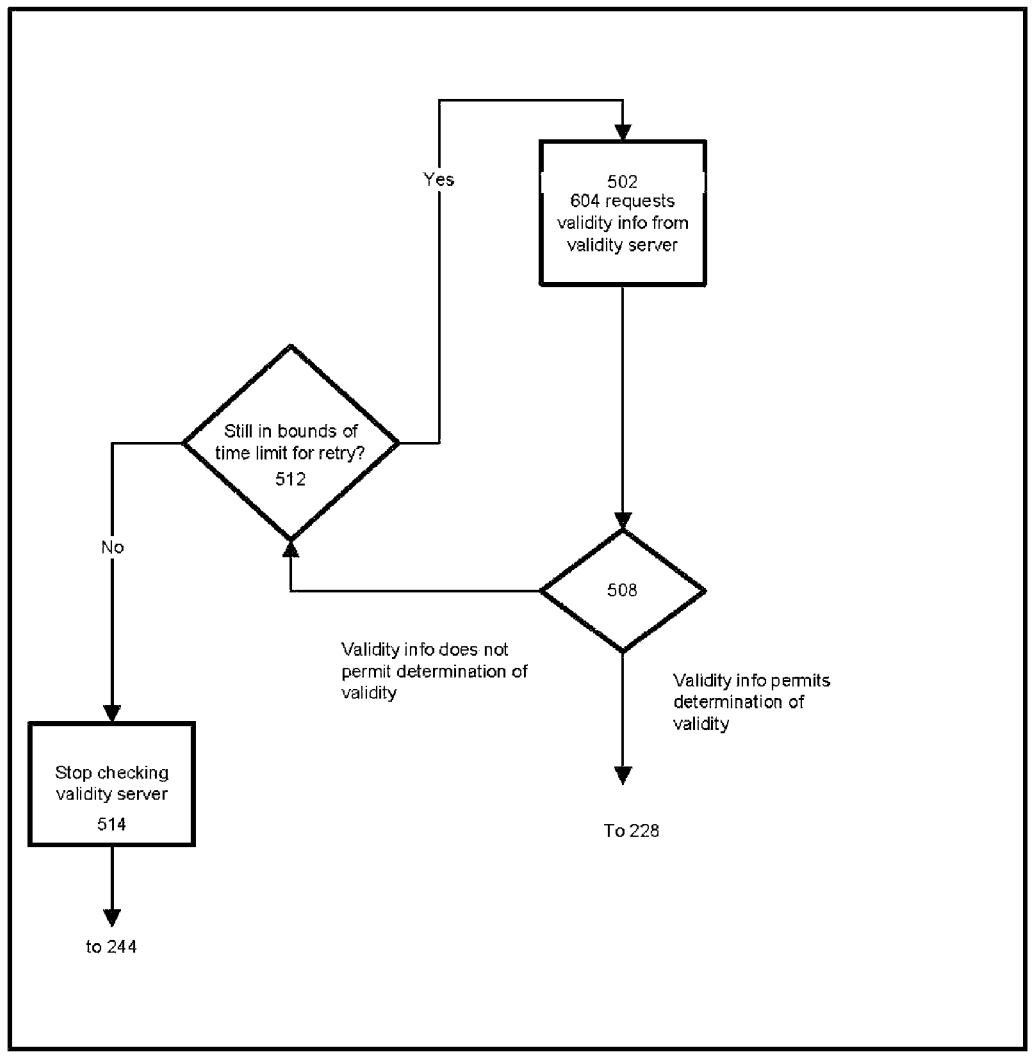
FIG. 5 details the Remote Re-validation process.

FIG. 5 shows details of getting validity information from validity server 122 (block 222 in FIG. 2). When no local read confirmation is received, validity test logic 604 requests validity info from validity server 122 (502). As shown at 508, if the validity information available on validity server 122 permits the validity of the barcode's coupon to be determined, the validity is determined as shown beginning at block 228 in FIG. 2; otherwise, validity test logic 604 continues to attempt to obtain the information from validity server 122 until a time limit is reached (512); if the information is not obtained, validity test logic 604 stops checking for validity and continues at loop 244 in FIG. 2.

While display barcode function 602 is the only function which will display a coupon's barcode in a fashion that is readable by scanner 116, there may be other functions in wallet 114 which permit users to examine the coupons in each set of coupons. A coupon in a set may further have user-visible validation status information associated with it. For example, the user-visible validation status information for an n-use coupon in set 610 may indicate the number of uses remaining, while the user-visible status information for such a coupon in set 614 may indicate that no uses remain and the user-visible status information for such a coupon in set 612 may indicate that wallet 114 is attempting to obtain the coupons current validity status from validity server 122.

Using System 100 with an n-use Coupon

The following is a detailed example of how the system described in FIG. 1 would work in practice for an n-use coupon. As already explained, an n-use coupon is one that may be used a fixed number of times and then becomes invalid. In the case of the n-use coupon, the validity event is provision of the coupon to a barcode reading system 118. Because the use count for an n-use coupon will not change until it is again used, the validity check for a given use may be done at any time during the period of time between the given use and the next use and thus may be done separately from the provision of the barcode to the POS system.

The first step is placing parameters for the n-use coupons on the server that is to distribute them. At a minimum, the parameters will include the numbers for the coupons and the validity conditions for the coupons. For an n-use coupon, the validity conditions specify the number of times the coupon can be used.

Once the promotion has started, a user makes a request via an SMS shortcode requesting that a particular coupon be returned to the mobile device. This SMS message could be in response to a specific SMS shortcode that is advertised in a broadcast medium such as radio, television, or billboards or is communicated by a telephone call, regular mail or email, or any other communication medium. The Content Delivery Server would receive this request and send a message to Coupon Package Generator 104 to assemble a package containing the requested coupon in graphic form along with its associated validity data. Each coupon has a unique barcode. Once the package was assembled, it would be published to Content Delivery Server 102. Content Delivery Server 102 would then return an SMS message to the mobile device. This returned SMS message would contain a link that the user could click on to download the package containing the electronic coupon 113 coupon and optionally a link for the user to click to download electronic wallet program 114.

When the user clicks on the link in the SMS to download the coupon package, the coupon package would be downloaded from Content Delivery Server 102 to mobile device 112 and provided to electronic wallet program 114. Wallet 114 will then place the coupon in the set 612 of coupons whose validity is not known.

Wallet 114 then uses validity test logic 604 to determine the current validity of the coupon. In some cases, all the information necessary will be contained in the coupon's control data 106; in other cases, validity test logic 604 may have to obtain validity information from validity server 122. If validity test logic 604 determines that the coupon is valid, it goes into set of coupons known to be currently valid 610; if validity test logic 604 determines that the coupon is not valid, it is discarded or goes into set 614 of coupons known to be invalid. Otherwise, it remains in set 612 of coupons whose current validity is unknown. When validity test logic 604 initially determines the validity of an n-use coupon, it associates a counter with the n-use coupon and sets the counter's value to (max-no-of-uses).

When the user enters a retail location and wishes to display the coupon, he/she runs the wallet application, selects the coupon from the set of coupons known to be valid 610 that he/she wishes to display, and indicates display barcode function 602 to mobile device 112. While the coupon is displayed, the wallet places it into the set of coupons 612 whose validity is currently unknown (preventing it from being displayed again), and the store clerk scans the cell phone display with a barcode scanner.

While the coupon is displayed, the wallet attempts to confirm that the barcode has been accurately read. Confirmation may be based on the "beep" emitted from point of sale system 118 when the barcode is read, on information obtained via wireless communication between mobile device 112 and point of sale system 118, or on the push of a button on the mobile device in response to the "beep". If the wallet receives the confirmation, it removes the barcode from the display on the mobile device. Validity test logic 604 then decrements the coupon's use count. If the use count has reached 0, the coupon is invalid and validity test logic 604 places it in set 614 of coupons known to be invalid; if it has not yet reached 0, the coupon is still valid and validity test logic 604 places it in set 610 of coupons known to be valid.

If there is no confirmation that the barcode was read, the wallet waits for a period of time and then removes the coupon from the display. Next, after a period that it deems sufficient for information about the read to reach validity server 122 via POS backend server 124 and then attempts to perform a remote validation.

The wallet sends a validation request to the validity server. What is in the request and how validity server 122 responds depends on the design of validity server 122. At a minimum, the request will require the coupon's barcode. The validity server may respond by indicating whether the coupon is valid or invalid or that it doesn't know or may respond by returning all of the validity information it has regarding the coupon, leaving it up to the wallet to determine validity, or may do something in between with regard both to the information it requires from the wallet and the information it returns to the wallet. The request may also specify the amount of time to continue to attempt to determine whether the coupon is still valid.

If the wallet is unable to contact the validity Server, it will periodically re-check the validity Server for an updated status. This processes repeats periodically for the amount of time specified in the Control Data. If at the end of this time period, the electronic wallet is not able to i) contact the control server, or ii) obtain the information needed to determine validity from the validity Server, then the coupon is left in the set of coupons whose current validity is unknown and the update process ceases. A validity status message associated with the coupon may indicate why the coupon's validity is unknown. If the wallet receives information from validity server 122 that indicates that the coupon is valid, and then it moves the coupon into the set 610 of coupons known to be valid; if the information indicates that the coupon is invalid, then it moves the coupon into the set 614 of coupons known to be invalid, as described above.

Variations on System 100
Ways of Obtaining Validity Information
In the mobile device:
The mobile device polls POS backend server 124 directly.
POS backend server 124 pushes data to mobile device.
Validity server 122 pushes data to mobile device.
In the validity server:
Validity server 122 polls one or more POS backend servers 124. They could request one coupon number at a time or a batch of numbers.
POS backend servers 124 push data to validity server 122. They could push one coupon number at a time or a batch of numbers.
End users input information about themselves that is relevant to coupon validation into validity server 122.

Other Ways to Use Validation Events and Validation Checking:
Membership
Club memberships that have contract expiration date but also require monthly payments. A local validation check on the mobile device can check to see if the term of the membership is still valid. If not valid due to expiration, a remote check can refresh the coupon. Similarly, monthly payments must be made during the term in order to keep the membership valid, so a remote validity check after each use can provide dunning message and disable the membership code if bills are not paid.
Store membership that is secured by a credit card and has no expiration date. After each use, the wallet can check the validity server which will respond with information regarding when the underlying credit card is going to expire. When it is near the expiration time, the validity server can respond with a message to update the credit card. If the credit card has expired, the membership can become invalid on that date. If the credit card has been updated, the local expiration date can be extended.
Tickets
One-time use tickets such as movie tickets. Movie tickets that may only be used one time would be an example of an n-use coupon where n=1.
Airline tickets which have multiple segments/related barcodes. These methods could be used to invalidate each segment after it was used as each segment needs to be invalidated separately.
Other
A validity event in one coupon which affects the validity of another coupon. For example, in the airline tickets just described, the validity event which resulted in one segment being invalidated could also render the next segment valid.

It should be further pointed out here that validity events can be employed in environments other than mobile devices. For example, validity events could be used to restrict the use of coupons downloaded to PCs in the same fashion as described above for mobile devices, except that the result of a coupon becoming invalid would be that the PC would no longer be able to print it.

Controlled Electronic Coupon Sharing

Prior art has suggested mechanisms for locking executable files, music, audio, and images to a particular phone as part of a Digital Rights Management scheme. Using DRM, publishers of electronic information can prevent end-users from transferring their content from one phone to another.

A major problem with this type of DRM is that end users often wish to share coupons (which may be represented by barcodes or applications that display barcodes) with other end users, but coupon issuers do not wish to allow person to person sharing unless they obtain information about the individual to whom the code is being transferred, such as a phone number or other opt-in information. What is needed, and what is provided by the present invention, is techniques for the controlled sharing of electronic coupons. Controlled sharing 1) Allows the coupon issuer to budget shared coupons along with "original" coupons; 2) Permits coupons being shared to be properly formatted for use on the destination device; 3) Allows coupon issuer to gather same data from sharee that it originally gathered from sharer; and 4) May allow coupon sharing to be controlled in the mobile device.

Overview of the Invention

Figure 8:
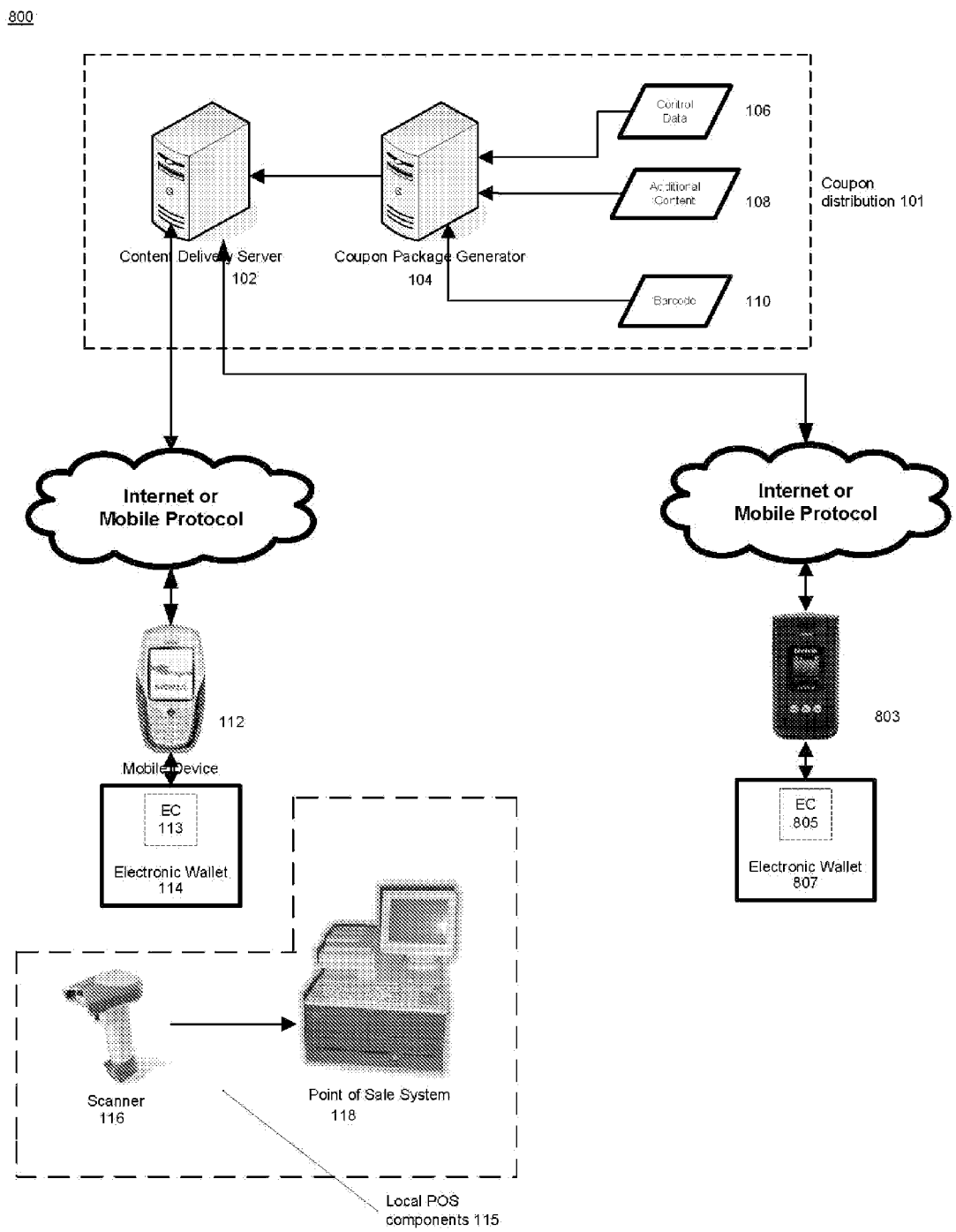
FIG. 8 is an overview of a system in which the techniques of the invention are employed.

FIG. 8 illustrates, in schematic form, a system 801 which provides a method for controlled sharing of electronic coupons in the form of barcodes. The main components of system 801 are coupon distribution system 101, a first mobile device 112 such as a cellular telephone or a PDA, and a second mobile device 803 such as a cellular telephone or a PDA.

Beginning with coupon distribution system 101, coupon distribution system 101 distributes electronic coupons to mobile devices. The coupons may be distributed in response to a request from the mobile device or from a user of the mobile device who makes the request via the Internet, or can even be distributed as unsolicited messages to the mobile device. When a coupon is to be distributed, coupon package generator 104 will generate an electronic package that represents the electronic coupon. The electronic package is then sent to the Content Delivery Server 102. The electronic package may contain the following:

i) the coupon's barcode 110; the barcode may be a display-ready image of the barcode or information from which a display of the barcode may be generated or the information contained in the barcode may be provided.

ii) some Control Data 106 which contains information detailing the number of times that coupon can be shared, which can be zero or some number greater than zero, plus a variety of information which describes how the coupon may be used which may include but not be limited to the following:

The number of times a coupon may be used;
The date on which the coupon expires;
Locations at which the coupon may be used; and a network location from which validity information about the coupon may be obtained.

iii) optionally Additional Content 108 for the coupon may include text or multimedia content.

A message is then sent to the mobile device via a message format such as SMS. The message may include a URL link to the package which was created. The user then clicks on this link and the package is downloaded to the mobile device 112. In mobile device 112, the electronic coupon, represented by box 113, is manipulated by electronic wallet software 114. Among the tasks performed by electronic wallet software 114 are determining whether a given electronic coupon is valid, determining if the coupon can be shared, and enabling an end user to share the coupon. In some embodiments, the wallet may communicate the coupon to the local point of sale system 118 by displaying the coupon's barcode on the mobile device's display screen so that the barcode can be read by scanner 116. It is important to note that the coupon's barcode can only be output by the electronic wallet application. An electronic coupon is output from a mobile device or other device when it is made available either directly or indirectly to a barcode reader. For example, with mobile devices, the barcode may be output to the barcode reader by displaying the barcode on the mobile device or by using a wireless protocol such as Bluetooth to directly provide the data represented by the barcode to the reader. With non-mobile devices such as PCs, the output may be printing at least the electronic coupon's barcode on a printer accessible to the non-mobile device. In sharing, the electronic coupon is made available to the reader by way of the device with which the coupon is being shared.

Figure 9:
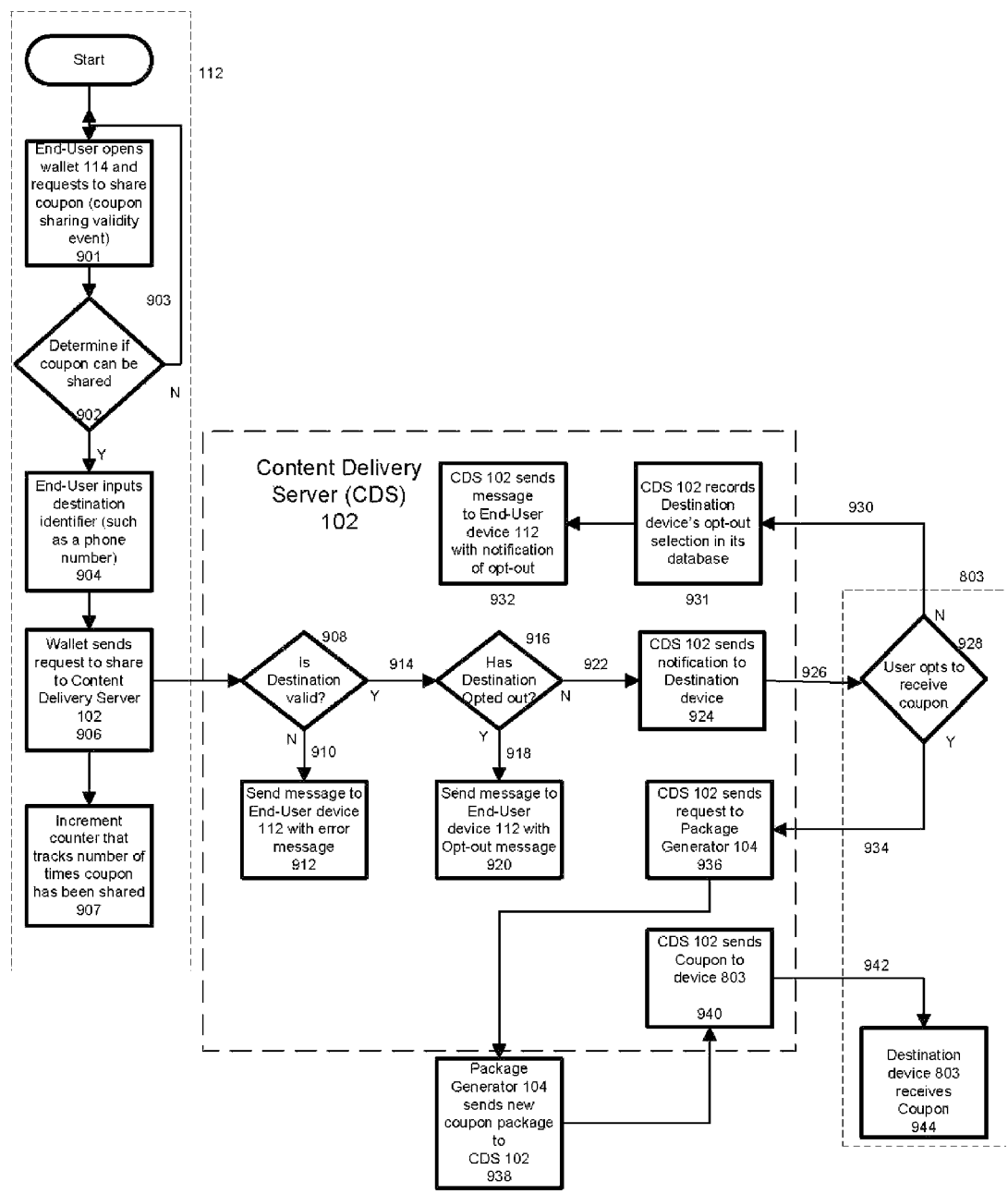
FIG. 9 details the process for requesting and generating a shared coupon.
Figure 10:
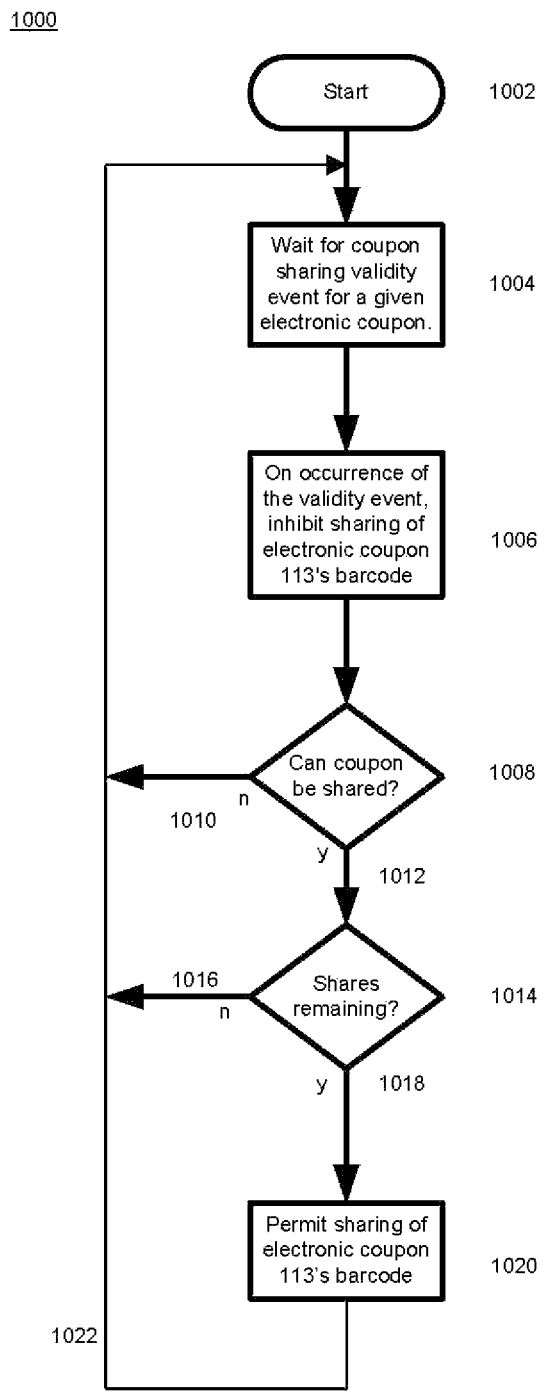
FIG. 10 is a flowchart of a coupon sharing validity event.

FIG. 9 illustrates how electronic wallet 114 in mobile device 112 and Content Delivery Server 102 work together when an end user wishes to share a coupon with another end user. If an end user wishes to share a coupon, s/he opens the electronic wallet 114, locates the coupon s/he wants to share, and requests to share the coupon 901. This request to share triggers a sharing validity event 902 which initiates the series of events shown in FIG. 10 to determine if the coupon can be shared.

At 1004, the wallet waits for a coupon sharing validity event. As shown at 1006, when a coupon sharing validity event occurs, the wallet inhibits the sharing of electronic coupon 113's barcode and then, using Control Data 106, tests to see if the coupon can be shared (1008), if not, the wallet executes path 1010 which in turn executes path 903.

If the coupon can be shared 1012, then the wallet logic compares the number of times the coupon has been shared with the Control Data 106 to see if the coupon has been shared more than the permitted number of times 1014. If there are no permitted shares remaining, the wallet executes path 1016 which in turn executes path 903.

If there are permitted shares remaining, the wallet executes path 1018 and permits the sharing of the electronic coupon 1020 and returning to FIG. 9, continues on to 904 where the electronic wallet requests the end user to input a destination to send the coupon. The wallet then sends the request to share to Content Delivery Server 102. This request to share will include information such as the coupon number and other portions of the control data necessary to uniquely identify the coupon to the Content Delivery Server. At the same time the wallet sends the request to share 906, it also sets a value that tracks the number of times the coupon has been shared 907 to indicate the number of times the coupon has been shared.

Content Delivery Server 102 first tests to see if the destination is valid 908. If it is not valid, path 910 is taken and the Content Delivery Server 102 returns a message to device 112 via message format such as SMS explaining that the destination device could not be located. If the destination is valid, then the Content Delivery Server 102 tests to see if the destination has opted out of receiving coupons 916. If the destination has opted out, then the Content Delivery Server 102 returns a message to device 112 via message format such as SMS explaining that the destination device has opted out of receiving coupons.

Content Delivery Server 102 may not only determine whether the device that is to receive the shared coupon desires to opt out. It may also determine whether an electronic coupon is to be shared on the basis of global information such as a) a maximum number of delivered coupons, b) a maximum budget amount (in dollars or other currency), or c) some other global limit, has been reached or exceeded. If the limit has been reached or exceeded, then the Content Delivery Server 102 returns a message to device 112 via message format such as SMS explaining that no additional coupons can be shared.

If the destination device has not opted out and a global limit has not been exceeded (as described above), then the Content Delivery Server 102 follows path 922 and sends a message to electronic wallet 120 on the destination device 116 via message format such as SMS and requests the end user of device 116 to confirm that s/he wishes to receive the coupon 928. This message may include URL links that allow the end user to indicate whether s/he wishes to receive all future coupons, only this coupon, no coupons at all, no coupons from device 112 (specific phone number or location), or no coupons from this particular coupon issuer. The message may also include fields which permit the end user to input opt-in information required for the coupon.

If the end user of device 803 opts to not receive this coupon, all future coupons, coupons from this coupon issuer, or coupons from device 112, then s/he clicks on the appropriate URL (path 930) which indicates to the Content Delivery Server 102 that the user does not wish to receive the coupon. Content Delivery Server 102 records this opt-out information in a database or similar system associated with this destination device/identifier for future reference (931). Content Delivery Server 102 in turn sends a message via message format such as SMS to end user device 112 with notification that end user of device 116 has opted out.

If the end user of device 803 opts to receive the coupon, then s/he clicks on the appropriate URL (path 934) which indicates to the Content Delivery Server 102 that the user wishes to receive the coupon. In addition, when the user clicks on the URL (path 934), device 803 will transmit a URL as part of its return message header. The URL points to information containing the display capabilities of the device 803 in a format such as Resource Description Framework (RDF), as well as any other opt-in information required for the coupon. Content Delivery Server 102 then sends a request which incorporates this information along with the coupon to be created to the coupon package generator 104. Coupon package generator 104 will generate an electronic package that represents the electronic coupon.

It should be noted that when the device with which the coupon is being shared is a mobile device, it may be necessary for coupon package generator 104 to manipulate any bar codes contained in the coupon to ensure that when the barcode is displayed in the mobile device's pixel display it will be readable by a bar code reader. As explained in PCT/US2007/010270, the solution to this readability issue has three parts.

Figure 16:
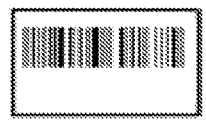
FIG. 16 shows examples of sample barcode manipulations.
Figure 16:
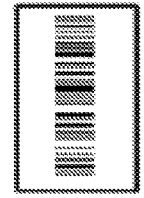
Figure 16:
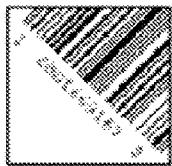
Figure 16:
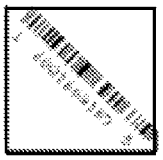
Figure 16:
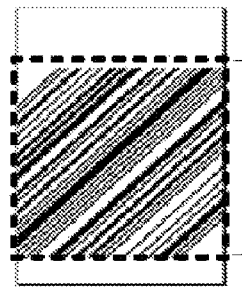
Figure 16:
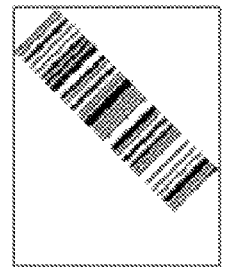
Figure 16:
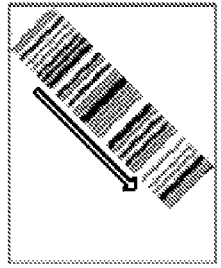

The first part is to orient/rotate the barcode in the display so that it can be sized for maximum readability. There are three different possibilities are shown in FIG. 16:

1) display the code horizontally as shown in 1602
2) display the code vertically as shown in 1604
3) Rotate/orient the barcode so that it is displayed diagonally on the display as shown in 1606, 1608, 1610, and 1612.

What is meant by diagonal in the present context is any orientation of the barcode in which the barcode is not parallel to the sides of the display.

The second part of the solution is to expand the barcode so that it is readable by the barcode reader.

The third part of the solution involves enabling further expansion of the displayed barcode by one or more of the following methods:

Method A) Reducing or eliminating redundant and error correction portions of the barcode (1708, 1710),
Method B) Changing the geometry of the barcode (1704, 1706),
Method C) Reducing the amount of location information needed to locate the barcode.

For further details, see PCT US2007/010270.

Figure 17:
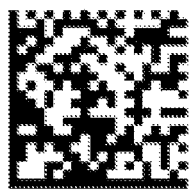
FIG. 17 shows examples of sample barcode manipulations for a 2-D DataMatrix barcode.
Figure 17:
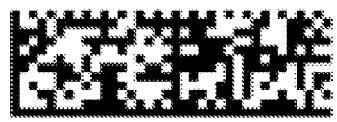
Figure 17:
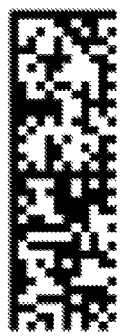
Figure 17:
Figure 17:
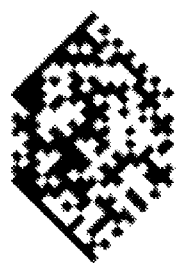

Once any required sizing has been done, a message is then sent to mobile device 803 via a message format such as SMS. The message may include a URL link to the package which was created. The user then clicks on this link and the package is downloaded to mobile device 803. In mobile device 803, the electronic coupon, represented by box 805, is manipulated by electronic wallet software 807. If the coupon contains a bar code and the coupon data is sent directly to the mobile device instead of an image of the bar code, the electronic wallet software 807 performs the manipulations described in FIGS. 16 and 17 and described above.

Using System 801 to Share a Coupon

The following is a detailed example of how the system described in FIG. 8 would work in practice for coupon sharing.

The first step is placing parameters for a) whether or not the coupon can be shared and b) if the coupon can be shared, the number of times that it can be shared into the control data 106 for the coupon on the server that is to distribute them.

Once the promotion has started, a user uses an SMS shortcode to request that a particular coupon be returned to mobile device 112. The user could obtain the SMS shortcode from an advertisement on television, radio, print, internet or other medium. Content Delivery Server 102 receives the shortcode and sends a message to Coupon Package Generator 104 to assemble a package containing the requested coupon in graphic form along with the coupon's associated control data. Each coupon has a unique barcode. Once the package is assembled, Coupon Package Generator 104 publishes it to Content Delivery Server 102. Content Delivery Server 102 then returns an SMS message to the mobile device. This returned SMS message would contains a link that the user can click on to download the package containing the electronic coupon 113 coupon and optionally a link for the user to click to download electronic wallet program 114.

When the user clicks on the link in the SMS to download the coupon package, the coupon package is downloaded from Content Delivery Server 102 to mobile device 112 and provided to electronic wallet program 114.

When the user enters a retail location and wishes to display the coupon, he/she runs the wallet application, selects the coupon from the set of coupons, and displays the coupon to point of sale system 118 and scanner 116 and the store clerk scans the cell phone display with a barcode scanner.

If the user wishes to share the coupon with another user, s/he runs the wallet application and selects an option to share the coupon. The wallet then tests to see if the coupon can be shared and if the user has shared more than the number of permitted times. If the coupon can be shared and there are permitted shares remaining, the user is then asked to input the telephone number of the destination device 803. The wallet application then i) sends a message to the Content Delivery Server 102 identifying the coupon that the user has asked to share and the destination number of the phone where the shared coupon is to be sent and ii) increments a counter that tracks the number of times the coupon has been shared 907.

Content Delivery Server 102 then determines if the destination phone number is valid and if the destination user has opted out of receiving coupons. If the phone number is invalid or the destination user has opted out, then Content Delivery Server 102 returns a message to the user indicating such information.

Otherwise, Content Delivery Server 102 prepares and sends a message to the destination device 803 via a message format such as SMS that user of device 112 would like to share a coupon with him/her. This message will contain two URL links for the destination user to use to respond. One link will indicate YES and the other will indicate NO.

(Alternatively, the message could contain multiple links for the user to choose from such as i) receive all future coupons, ii) receive only this coupon, iii) receive no coupons at all, iv) receive no coupons from device 112 (specific phone number or location), or v) receive no coupons from this particular coupon issuer.)

The user of device 803 then selects one of the two links. If the NO link is selected, this will indicate to Content Delivery Server 102 that the user of device 116 does not wish to receive this coupon and Content Delivery Server 102 will send a message back to the original user via message format such as SMS indicating this information.

If the YES link is selected, then the Content Delivery Server 102 will obtain information about the receiving device's display characteristics by accessing the RDF information pointed to by the URL contained in the message header. The Content Delivery Server 102 will then receive this request and send a message to Coupon Package Generator 104 to assemble a package containing the requested coupon in graphic form along with its associated control data. Each coupon has a unique barcode. Once the package is assembled, it is published to Content Delivery Server 102. Content Delivery Server 102 then returns an SMS message to mobile device 803. This returned SMS message contains a link that the user can click on to download the package containing the electronic coupon 805 and optionally a link for the user to click to download electronic wallet program 807.

Variations on System 801

Other ways users can share coupons

Wallet 114 can initiate communication directly to device 803 via a message format such as SMS. The enclosed message can contain a link to Content Delivery Server 102 that would enable user of device 803 to initiate the processes of i) opting-in out and ii) obtaining a coupon.

Wallet 114 can initiate communication directly to wallet 807 by sending a message via message format such as SMS which includes a binary payload that can be read by wallet 807. The binary payload contains the opt-in/out questions and other coupon related information such as Control Data 106 and information to uniquely identify the coupon being shared. When the end user of device 803 clicks on the message and opens the payload, wallet 807 displays the opt-in/out questions, retrieves the answers from the end user of device 803, and then causes wallet 807 to communicate this information directly to Content Delivery Server 102 to initiate the process of generating and delivering a coupon to device 803 and wallet 807. It should further be pointed out here that controlled coupon sharing could also be done with coupons downloaded to non-mobile devices such as desk top PC's. A sharing validity event would prevent the coupon from being shared until the validity of the coupon for sharing was determined and a coupon which was invalid could not be sent from the PC to another destination. Sharing in this context could be done by email.

Making an Electronic Coupon Redeemable in Response to a Sequence of end User Behaviors Description of Related Art Prior art has suggested ways for advertisers to incorporate shortcodes into their advertising so that end users can respond to such shortcodes and receive coupons to their mobile devices. In these existing methods, the user simply redeems the coupon. What is lacking is coupons which require the user to perform a sequence of actions before the coupon becomes redeemable.

As an example, the creator of a television show with 24 episodes might wish to get audience members to a) watch all 24 episodes and b) watch the commercials during each episode instead of fast forwarding through them with a device such as a personal video recorder. Creators of these television shows can place shortcodes into certain commercials that end users can respond to and in turn receive tokens or partial coupons while each show is being aired. Only after an end user has collected all 24 (in this example) tokens will s/he be able to display and/or redeem a "super" coupon.

As another example, a manufacturer may want to reward users who have used a coupon or coupons to purchase a certain volume of product with another coupon for a different product ("Use our coupons to buy all 6 place settings and get a coupon for a free teapot"). In this case, when the end user has used all 6 coupons to purchase 6 place settings, s/he will receive a $7^{th}$ coupon for a teapot.

It is thus an object of the invention to provide an electronic coupon which becomes redeemable only after the user has performed a sequence of actions. Such electronic coupons will be termed in the following SuperCoupons.

Overview of SuperCoupons

Figure 11:
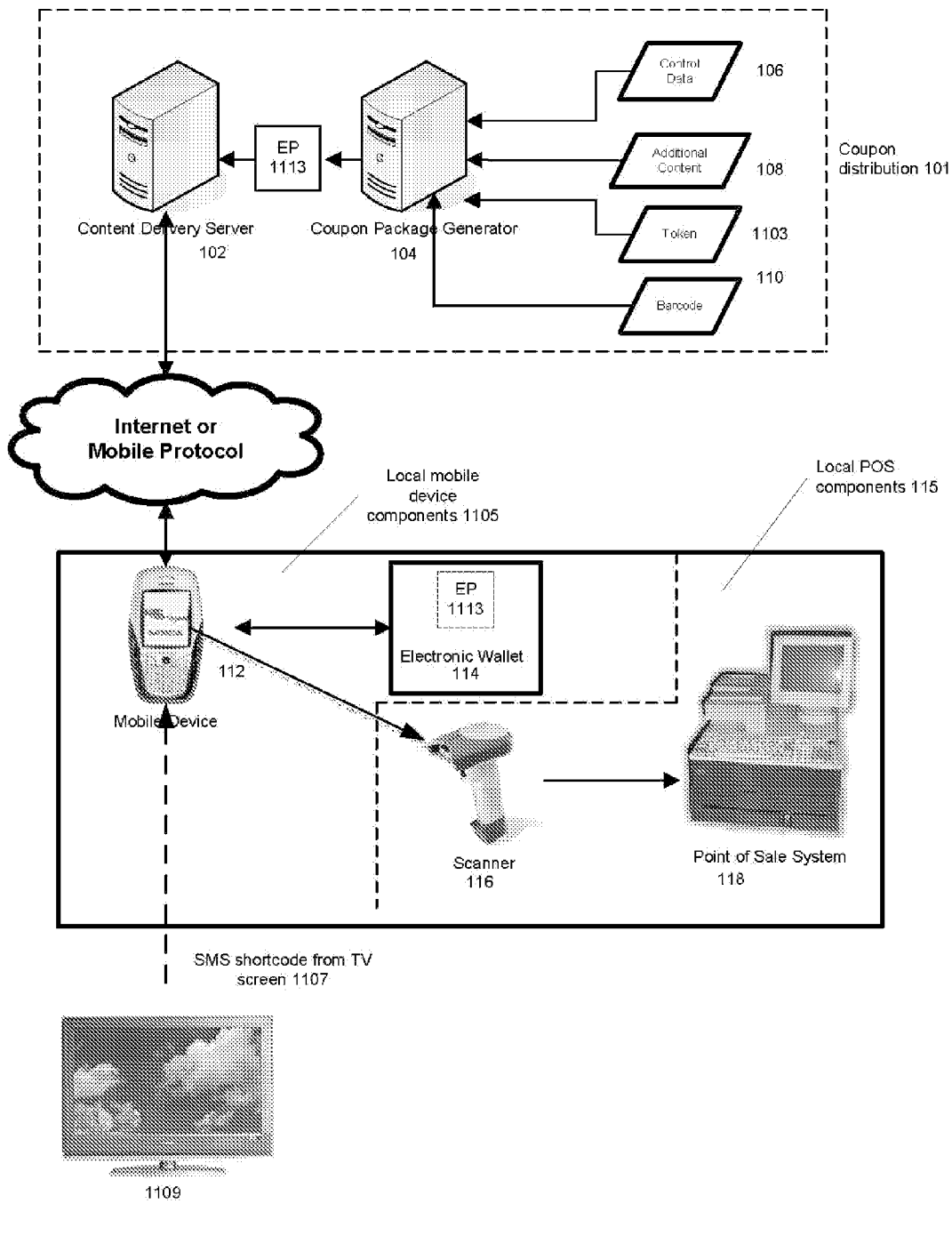
FIG. 11 is an overview of a system in which the techniques of the invention are employed.
Figure 15:
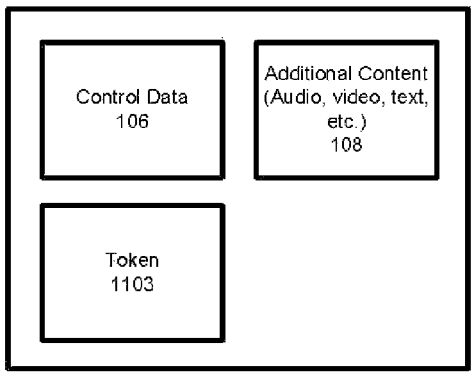
FIG. 15 is a diagram of the different package types containing tokens.
Figure 15:
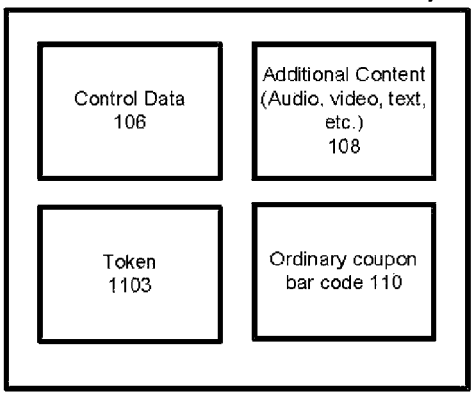
Figure 15:
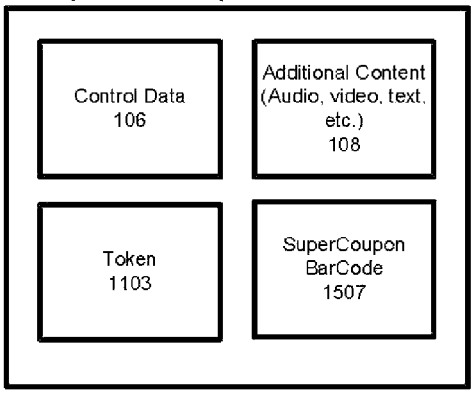

FIG. 11 illustrates, in schematic form, a system 1101 for using a mobile device to provide a barcode from an electronic coupon whose validity is known to a point of sale system. The main components of system 1101 are coupon distribution system 101, a mobile device 112 such as a cellular telephone or a PDA, and the local components 115 of a point of sale (POS) system 118 that can scan barcodes Beginning with coupon distribution system 101, coupon distribution system 101 distributes electronic coupons to mobile devices in response to a request from the mobile device. When a coupon is to be distributed, coupon package generator 104 will generate an electronic package (EP 113) that contains coupon-related information. The electronic package is then sent to the Content Delivery Server 102. The exact contents of the electronic package will depend on the kind of coupon. FIG. 15 shows a number of packages that contain information related to SuperCoupons.

All of the packages include at least the following:
i) the package's token 1103; each token indicates that the user has performed one action of the sequence of actions; the SuperCoupon with which the tokens are associated becomes redeemable only after all of the associated tokens have been received. In some applications, the tokens may be received in any order; in others, there may be a requirement that the tokens be received in a particular order.
ii) some Control Data 106 which contains information such as:

Information about the token, if present, such as the kind of SuperCoupon that the token helps to enable How many of each type of token are required to enable a given coupon and any order conditions. (Validity Conditions)

The date on which the token and SuperCoupon expire;

Locations at which the SuperCoupon may be used; and
iii) optionally Additional Content 108 may include text or multimedia content.

A package that contains only the token, control data, and additional content is shown at 1502. One that additionally contains a standard electronic coupon is shown at 1504; package 1504 can be used in a situation where the user receives a SuperCoupon after he/she has redeemed a set of ordinary electronic coupons; a package which additionally contains a SuperCoupon 1507 is shown at 1506. The package will clearly indicate whether a coupon is a regular coupon or a SuperCoupon, either by means of information in the token, information in control data 106, or information in the coupon itself. Of course, in some cases, the regular coupon will function both as a regular coupon and a token.

Returning to FIG. 11, the process of obtaining a coupon begins with obtaining an SMS shortcode 1107 which can be used to obtain the coupon. The user of mobile device 112 employs the shortcode to contact Content Delivery Server 102. Content Delivery Server 102 responds to the shortcode by sending a message to mobile device 112 via a message format such as SMS. The message may include a URL link to electronic package 1113 (EP 1113). The user then clicks on this link and package 1113 is downloaded to the mobile device 112.

In mobile device 112, EP 1113, is manipulated by electronic wallet software 114. Among the tasks performed by electronic wallet software 114 are determining whether a given EP 1113 contains a token. If EP 1113 contains a token, a token validity event occurs. On occurrence of this event, electronic wallet 114 determines whether the arrival of the token has made a SuperCoupon redeemable. If it has, wallet 114 will permit the user to output the redeemable SuperCoupon to the local point of sale system 118. In some embodiments, the wallet may output the coupon to the local point of sale system 118 by displaying the coupon's barcode on the mobile device's display screen so that the barcode can be read by scanner 116. It is important to note that the coupon's barcode can only be output by the electronic wallet application.

Figure 12:
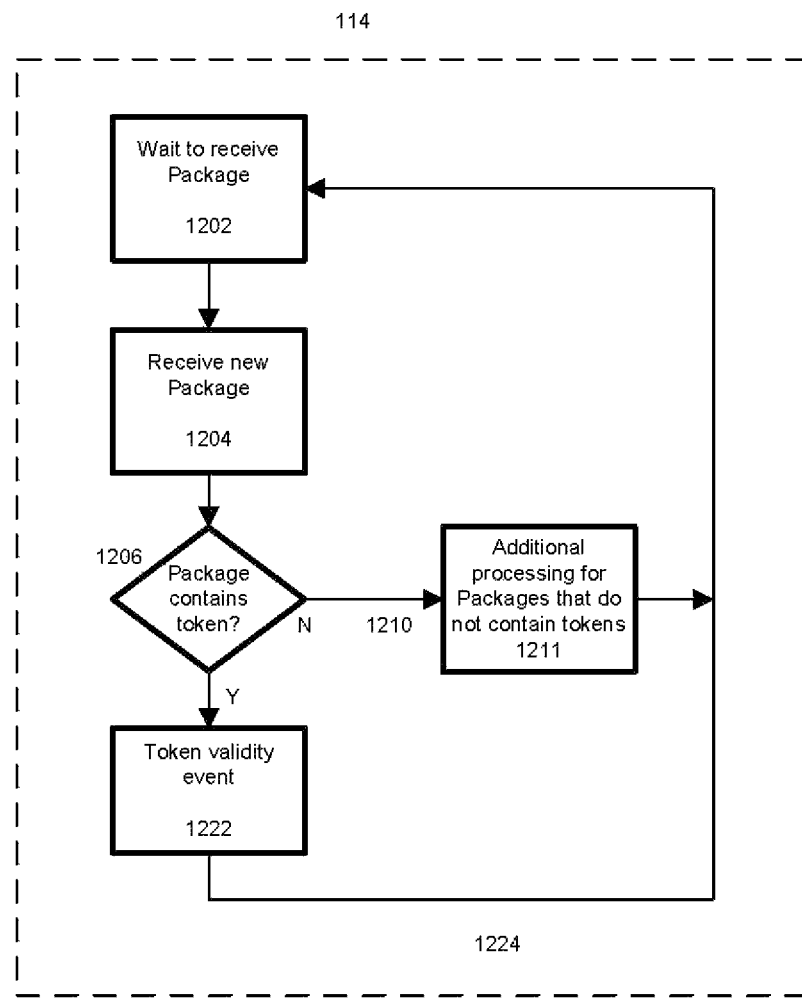
FIG. 12 details a process for validating SuperCoupons.

FIG. 12 is a detailed block diagram of electronic wallet application program 114. When the mobile device opens EP 1113, the MIME type associated with the package opens electronic wallet application 114 and provides the package to wallet application 114.

If the user does not have a previously installed electronic wallet 114 on his/her mobile device, then another link contained in the SMS message will allow him/her to download and install electronic wallet 114 on the mobile device prior to downloading EP 1113.

Figure 13:
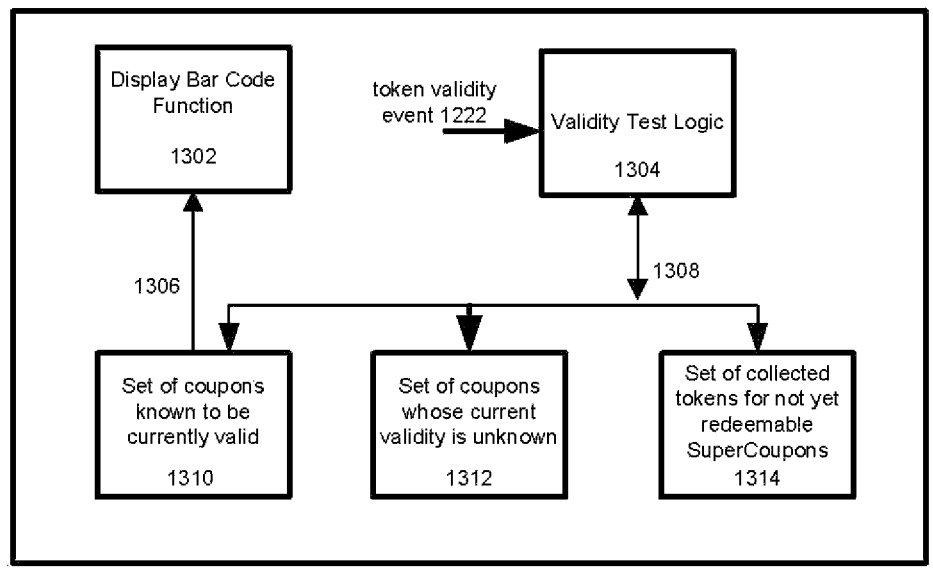
FIG. 13 is a block diagram of the wallet components.

As shown in FIG. 13, when configured to deal with SuperCoupons, electronic wallet 114 contains 5 major components:
1) A set 1310 of coupons that are known by the wallet to be currently valid.
2) A set 1312 of coupons whose current validity is not known to the wallet; this set includes SuperCoupons for which one or more tokens are still lacking.
3) A set of tokens 1314 which the wallet has collected for SuperCoupons which are not yet redeemable.

4) Validity test logic 1304 which responds to a token validity event 1222 by determining whether the validity event has made any SuperCoupon redeemable and if so, moving the redeemable SuperCoupon to set 1310 and removing the SuperCoupon's tokens from set 1314; and
5) a program 1302 that permits the end user to display barcodes belonging to coupons in set 1310 in a form that a barcode scanner can read.

The sets of coupons may be implemented using any technique that divides the coupons into distinct groups. Example implementations are flags associated with the coupons that indicate which of the sets a particular coupon belongs to and a linked list for each set of coupons.

FIG. 12 illustrates in overview how the electronic wallet 114 processes new packages from. Content Delivery Server 102. When the wallet receives a new package (1204), it determines if the package contains a token. If it does not contain a token, then the wallet performs some additional processing on the package (path 1210 and 1224) and then waits to receive the next package (1202).

If the package does contain a token, a token validity event 1222 has occurred and wallet 114 checks to see whether the arrival of the token has made a SuperCoupon redeemable. If it has, the process continues with the steps shown in FIG. 14 as described below. (Other validity events are explained in detail in the parent of the present patent application.) It should also be noted that for the present discussion, wallet 114 is configured only for token validity events to make the system easier to explain, but token validity events can co-exist with the types of validity events described in the parent.

Figure 14:
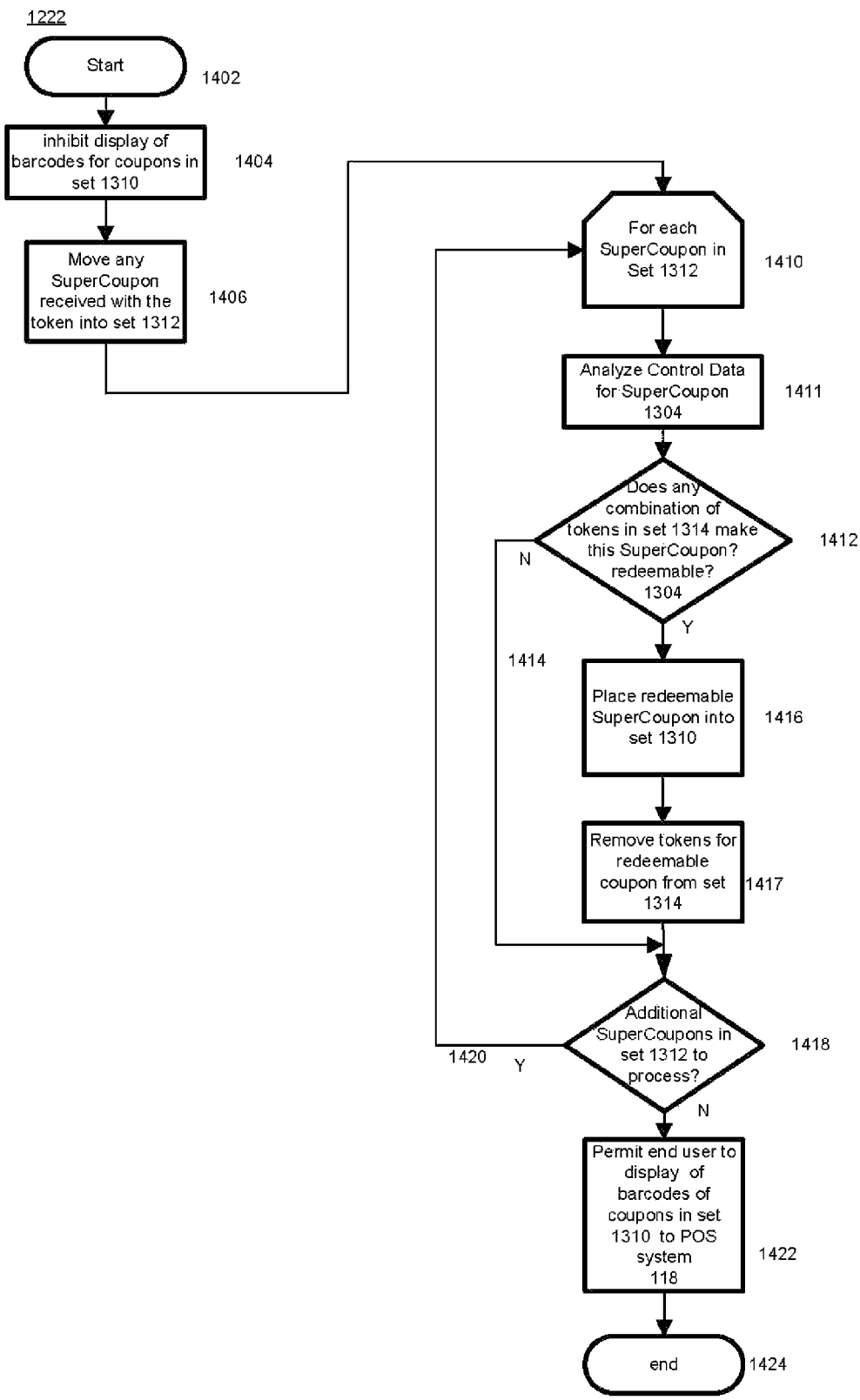
FIG. 14 is a flowchart of the manner in which the wallet responds to a validity event.

Continuing on to FIG. 14, which shows details of token validation event 1222, tie first step in the event is to temporarily inhibit the display of barcodes for coupons in set 1310 while the balance of the steps shown in FIG. 14 are followed (1404) then, any SuperCoupon received with the token is moved into set 1312 (1406). In loop 1420, validity test logic 1304 in wallet 114 analyzes each of the SuperCoupons in Set 1312 according to the following steps:

1) The wallet looks at the Control Data for the SuperCoupon to determine how many tokens are required to enable it and/or which specific tokens are required to enable it (1411).
2) The wallet next analyzes the tokens in set 1314 and determines if the correct tokens and/or the correct number of tokens are contained in set 1314 to make the SuperCoupon being analyzed redeemable (1412).
3) If the Validity Conditions specified in the Control Data are not met, then the SuperCoupon is not redeemable and the SuperCoupon remains in set 1312 (1414).
4) If the Validity Conditions specified in the Control Data are met, then the SuperCoupon is redeemable and is moved into set 1310 (1416). In some embodiments, wallet 114 may fetch the redeemable SuperCoupon from coupon package generator 104 before moving it to set 1310.
5) Wallet 114 removes all of the tokens for the SuperCoupon that was moved to set 1310 from set 1314.
6) The wallet repeats these steps for each SuperCoupon in set 1312 (1418, 1420).
7) After the wallet has processed all of the SuperCoupons in Set 1312, the end user may again display barcodes of coupons in set 310 to POS system 118. (1422).

Note that the foregoing scheme for determining whether a SuperCoupon is redeemable would also permit a token to specify that a SuperCoupon has become permanently unredeemable. Such a SuperCoupon may be removed from set 1310 or 312 and its tokens removed from set 1314.

At this point, any redeemable SuperCoupons will be in set 1310 and can be presented to POS System 118.

As noted above, in some implementations the SuperCoupon barcode will only be generated and delivered to the electronic wallet 114 after all of the tokens have been collected. In this case, one of the following sequences of events may occur: 1) when the user collects the last token and the validity test logic 1304 in wallet 1114 determines that the SuperCoupon should be enabled, the wallet will request the Content Delivery Server to deliver the SuperCoupon barcode (and any required final token) to the wallet, 2) the Content Delivery Server will track each end user request for tokens and when it determines that a specific end user has requested all of the tokens required for a particular SuperCoupon, the Content Delivery Server will request that a SuperCoupon package be created containing the SuperCoupon barcode (and any required final token) and will send an alert to mobile device 112 via a communication such as an SMS message that the SuperCoupon package containing the SuperCoupon barcode is available, or 3) some combination of 1 and 2 which allows the wallet and server to confirm each other.

It should be noted that in some implementations, Validity Test Logic 1304 may take into account the order in which the tokens were received (or requested) by the end user when determining whether or not a SuperCoupon is redeemable. This functionality would allow the coupon issuer to add an additional parameter, the order of requested tokens, to the conditions for making a SuperCoupon redeemable.

Using System 1101 with a SuperCoupon

The following is a detailed example of how system 1101 described in FIG. 11 would work in practice for a SuperCoupon where a user was required to make three individual requests in order to enable the SuperCoupon. Once an end user has collected all of the tokens required to enable the SuperCoupon, the SuperCoupon is redeemable and can be presented to a POS system.

The first step is placing parameters for the SuperCoupon on Coupon package generator 104 that is to distribute them. At a minimum, the parameters will include a) whether a given coupon is a SuperCoupon b) what tokens are required to enable the SuperCoupon, and c) how a user can retrieve the tokens.

Once the promotion has started, a user makes a request via an SMS shortcode requesting that a particular SuperCoupon be returned to the mobile device. This SMS message could be in response to a specific SMS shortcode advertised on television, radio, web or other medium. Content Delivery Server 102 would receive this request and send a message to Coupon Package Generator 104 to assemble a package of the type required for a SuperCoupon. In this example, it will be presumed to be a package of type 1506. Once the package is assembled, it is published to Content Delivery Server 102. Content Delivery Server 102 would then return an SMS message to the mobile device. This returned SMS message would contain a link that the user could click on to download EP 1113 and optionally a link for the user to click to download electronic wallet program 114.

When the user clicks on the link in the SMS to download the coupon package, the coupon package would be downloaded from Content Delivery Server 102 to mobile device 112 and provided to electronic wallet program 114. Wallet 114 will then place the SuperCoupon in the set 1312 of coupons whose validity is not known and place the token into set 1314 of collected tokens Because the package contains a token, a token validity event 1222 has occurred. Wallet 114 consequently uses validity test logic 1304 to determine the current validity of the SuperCoupons in set 1312 as described above in FIG. 14.

As the promotion continues, the user makes additional requests via SMS shortcodes requesting that a token for a particular SuperCoupon be returned to the mobile device. In these cases, the SMS message will contain a link to a package 506 for the new token.

When the user clicks on the link in the SMS to download the new package 1113, the package is downloaded from Content Delivery Server 102 to mobile device 112 and provided to electronic wallet program 114. Another token validity event occurs and is dealt with as described above. Because wallet 114 already has a copy of the SuperCoupon, it discards the copy received in the new package 1113. When all of the tokens for the SuperCoupon have been received in wallet 114, the token validity event associated with the arrival of the last token causes wallet 114 to move the SuperCoupon into set 1310 and remove the tokens for the SuperCoupon from set 1314. The user can now redeem the SuperCoupon. At this point, or at any point after an initial token has been received by the wallet, the user can run the wallet application and see the SuperCoupon(s) for which s/he is collecting tokens, the number of tokens collected for each SuperCoupon, and the number and/or types of tokens remaining to be collected in order to enable each SuperCoupon.

When the user enters a retail location and wishes to display the SuperCoupon, he/she runs the wallet application on mobile device 112, selects the coupon from the set of coupons known to be valid 1310 that he/she wishes to display, and selects display barcode function 1302. At this point, the store clerk scans the mobile device's display with a barcode scanner.

Other Embodiments

SuperCoupons can be implemented on a central server, on software that runs on the end user's device, or a combination of both. In either case, it may be important for the coupon issuer to limit the amount of time tokens for a particular SuperCoupon are available to an end user as well as how long a SuperCoupon is redeemable after all of the tokens have been obtained.

i) If SuperCoupons are implemented on the server, then the server will track the unique identifier (example: phone number, email address) to which the message containing the token has been sent. The server will also track whether requests are coming in during the limited availability period (requests that come in outside of this time period will be ignored.) Once a given unique identifier has requested either a) some minimum number of tokens, or b) all of the tokens required to complete a Super Coupon, the server will issue the Super Coupon.

ii) If this process is managed on the end user's mobile device/client, then the electronic wallet software on the end user's mobile device/client will track which tokens have been received and when the SuperCoupon becomes redeemable.

The tokens will have data in the packages containing the tokens which permits the electronic wallet software to determine a) how many tokens and which tokens are required to make the SuperCoupon redeemable, and b) how to display or communicate the SuperCoupon.

iii) Some combination of i and ii above.

Example: A music publisher wants to provide a special coupon to all of the people that send an SMS at least once during the 1 hour immediately following each of 12 television shows. If an end user sent in an SMS once during the one-hour period after each show (for a total of 12 times), then that user would have received 12 Tokens during the 12 week run of the television show. If a particular user did not send in a message via SMS during the 1 hour period after a particular television show, then that user would not be able to receive that particular Token. When the user received the $12^{th}$ Token, either a) the central server would issue a $13^{th}$ "SuperCoupon" to the end user, or b) the electronic wallet software on the mobile device would make the "SuperCoupon" available for display and/or redemption. If the user did not receive each of the 12 coupons, then the SuperCoupon would NOT be transmitted or displayed and the end user would NOT be able to redeem the Super Coupon. Note: It is likely that in this example the SuperCoupon would be an individualized coupon—i.e. no two would be alike.

As is the case with n-use coupons and shared coupons, SuperCoupons can be used with non-mobile devices such as PCs. In such applications, the SuperCoupon could not be printed until tokens indicating the occurrence of all of the necessary events had been received in the PC.

Conclusion

The foregoing Detailed Description has disclosed to those skilled in the relevant technologies how to use validity events to prevent a mobile device that contains electronic coupons with barcodes from providing the barcodes of invalid coupons to a barcode reading system. The Detailed Description has further disclosed the best mode presently known to Applicants of implementing validity events and has disclosed how validity events may be used to permit a coupon to be used n times and no more, how they may be used to invalidate an expired coupon, how they may be used to control coupon sharing, and how they may be used to implement SuperCoupons. It will be, however, immediately apparent to those skilled in the relevant technologies that Applicants' validity events represent a fundamental solution to the problem of ensuring that a coupon is valid without having to check the coupon's validity with a central server at the time the coupon's barcode is provided to the barcode reading system. There are and will be many different kinds of barcode reading systems and many different ways of providing the barcode to the barcode reading system, as well as many different ways of providing information about the reading process to the mobile device when the barcode is read and varying amounts of such information. The same is true with regard to validity information which the mobile device receives from a validity server. It should further be pointed out that the use of validity events is not limited to mobile devices; they could also be used with coupons distributed to non-mobile devices. In such applications, a PC, for example, could not print the coupon unless it was valid. Similarly, in the case of shared coupons, the PC could not share the coupon unless it was valid for sharing. In this case, the sharing could be done via email messages.

The kinds of validity events, their semantics, and the manner in which the mobile device responds to a given validity event are as numerous as the different kinds of functions which an electronic coupon may have and the kinds of information required to detect and deal with a given validity event depends completely on the semantics of the event. Human ingenuity can further be relied upon to constantly increase the capabilities of the mobile devices, barcode reading systems, servers, and networks in which the techniques disclosed herein are implemented and also to constantly develop new kinds of coupons, new validity events, and new responses to validity events. Moreover, coupons with different kinds of validity events may be combined. For example, in order to make a SuperCoupon redeemable, a user may have to share the SuperCoupon or another coupon with a certain number of other users within a particular period of time. Using the techniques just described, it would even be possible to require that the users be different users. For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

The invention claimed is:

1. A method employed in a device which outputs barcodes belonging to electronic coupons directly to a barcode reading device for reading by the barcode reading device of ensuring that a given electronic coupon is valid for a particular kind of use, the method comprising the steps performed in the device of:
    responding, at a time other than upon user selection of a given electronic coupon, to a validity event which may affect the validity of the given electronic coupon for the particular kind of use by inhibiting output of the barcode belonging to the given electronic coupon for the particular kind of use;
    determining, while the output of the barcode is inhibited, on the basis of validity information which is available in the device prior to the validity event whether the given electronic coupon is currently valid for the particular kind of use; and
    subsequent to the determination of whether the given electronic coupon is currently valid for the particular kind of use, ceasing to inhibit output of the given electronic coupon's barcode for the particular kind of use if the given electronic coupon is determined to be currently valid for the particular kind of use.

2. The method set forth in claim 1 wherein the step of responding to the validity event further comprises the step of:
    updating the validity information in response to the validity event.

3. The method set forth in claim 2 wherein the step of updating the validity information includes the step of:
    updating the validity information using information obtained from a source external to the mobile device.

4. The method set forth in claim 3 wherein:
    the external source is a barcode reading system to which the barcode reading device belongs.

5. The method set forth in claim 3 wherein:
    the external source is a validity server.

6. The method set forth in claim 1 wherein:
    the kind of use is having the coupon read by the barcode reading device; and
    the validity event is the step of indicating to the device that the device is to output the barcode for reading by the barcode reading device.

7. The method set forth in claim 6 wherein:
    the coupon is valid for a fixed number of readings;
    the device contains a number of readings value that indicates how many times the coupon has already been output for reading; and
    in the step of determining whether the given electronic coupon is valid for the use, the device employs the number of readings value.

8. The method set forth in claim 6 wherein
    the step of determining whether the given electronic coupon is currently valid includes the steps of:
    obtaining an indication from the barcode reading system that the barcode was read by the barcode reading system; and
    determining whether the given electronic coupon is currently valid by using the indication to determine whether the given electronic coupon is valid for a further use.

9. The method set forth in claim 6 wherein:
    the step of determining whether the given electronic coupon is currently valid includes the steps of:
    obtaining an indication from a validity server whether the barcode was read by the barcode reading system;
    and determining whether the given electronic coupon is currently valid by using the indication to determine whether the given electronic coupon is valid for a further use.

10. The method set forth in claim 1 wherein:
    the coupon ceases being valid for the use at a fixed point in time; and the validity event is the occurrence of the point in time.

11. The method set forth in claim 10 wherein:
    the occurrence of the point of time is determined from the device's clock.

12. The method set forth in claim 1 wherein:
    the validity event is receiving location input in the device that affects the validity of the given electronic coupon.

13. The method set forth in claim 1 wherein:
    the validity event is receiving input in the device that redefines the validity of the given electronic coupon.

14. The method set forth in claim 1 wherein:
    the validity event is receiving the given electronic coupon in the mobile device.

15. The method set forth in claim 1 wherein:
    the particular kind of use belongs to a plurality thereof; and
    the validity event belongs to a plurality thereof.

16. The method set forth in claim 1 wherein:
    the kind of use is sharing the coupon; and
    the validity event is the step of indicating to the device that the coupon is to be shared.

17. The method set forth in claim 16 wherein:
    the coupon may be shared a fixed number of times; and
    the step of indicating to the device that the coupon is to be shared includes the step of:
    determining whether the coupon has already been shared the fixed number of times, the coupon being shared only if the coupon has not already been shared the fixed number of times; and
    the method further includes the step of updating a number-of-times-shared value in the device each time the coupon is shared.

18. The method set forth in claim 16 wherein:
    the step of indicating to the device that the coupon is to be shared includes the step of
    providing an indication of a destination device to which the shared coupon is to be sent and
    the coupon is shared only if the indication is valid.

19. The method set forth in claim 18 wherein:
    the step of indicating to the device that the coupon is to be shared includes the step of:
    receiving an indication whether the destination device will accept the coupon to be shared; and
    the coupon is shared only if the indication whether the destination device will accept the coupon indicates that the destination device will accept the coupon.

20. The method set forth in claim 19 wherein:
    the device may share the coupon a fixed number of times; and
    the step of indicating to the device that the coupon is to be shared includes the step of:
    determining whether the device has already shared the coupon the fixed number of times, the coupon being shared only if the coupon has not already been shared the fixed number of times; and the method further includes the step of updating a number-of-times-shared value in the device each time the coupon is shared.

21. The method set forth in claim 16 further comprising:
a content delivery server that delivers the shared coupon to the device with which it is to be shared
and wherein
the device shares the coupon by providing the coupon to the content delivery server;
there is a global condition which limits sharing of the coupon; and
the content delivery server that delivers the shared coupon informs the device which is sharing the coupon when the global condition has arisen, whereupon the device no longer responds to sharing validity events by sharing the coupon.

22. The method set forth in claim 16 further comprising:
a content delivery server that delivers the shared coupon to the device with which the shared coupon is to be shared
and wherein
the device shares the coupon by providing the coupon to the content delivery server and
the content delivery server formats the coupon's barcode as required for the device with which the shared coupon is to be shared.

23. The method set forth in claim 22 wherein:
the device with which the coupon is to be shared is a mobile device with a display; and
the content delivery server formats the coupon's barcode as required for the display of the mobile device with which the coupon is to be shared.

24. The method set forth in claim 1 wherein:
the given coupon's use depends on the occurrence of all of the events in a set thereof;
the validity event indicates an occurrence of an event of the set of events;
the mobile device responds to the validity event by determining in the device whether all of the events in the set have occurred; and
in the step of determining, the given electronic coupon is valid if all of the events have occurred.

25. The method set forth in claim 24 further including the steps of:
for each occurrence of an event, storing an indication of the occurrence of the event in the mobile device; and
when the electronic coupon is determined to be valid, invalidating the stored indications of the events.

26. The method set forth in claim 24 wherein:
the events must occur in a particular order;
the step of determining further includes the step of determining whether the events occurred in the particular order; and
the step of permitting the use occurs only if the events occurred in the particular order.

27. The method set forth in claim 24
wherein: the event occurs as a result of an action that was performed by a user of the device.

28. The method set forth in claim 27 wherein:
one or more other coupons are associated with the coupon; and
the action is the provision by the user of a barcode from an other coupon to the barcode reader.

29. The method set forth in claim 27 wherein:
the action by the user results in the transmission of an event notification to the device.

30. The method set forth in claim 29 wherein:
the action by the user involves the device.

31. The method set forth in claim 1 wherein:
the device is a mobile device; and
the validity event is displaying the barcode in the mobile device.

32. A memory device which is accessible to the device which outputs barcodes, the memory device being characterized in that: the memory device contains code which, when executed by the device which outputs barcodes, performs the method set forth in claim 1.

33. A device that outputs barcodes belonging to electronic coupons directly to a barcode reading system for reading by the barcode reading system, the device being characterized in that:
the device includes an electronic coupon handler that (i) responds, at a time other than upon user selection of a given electronic coupon, to a validity event which may affect the validity of the given electronic coupon for a particular kind of use by inhibiting output of the barcode belonging to the given electronic coupon for the particular kind of use; (ii) while the output of the barcode is inhibited, determines on the basis of validity information available in the device prior to the validity event whether the given electronic coupon is currently valid for the kind of use; and (iii) subsequent to the determination of whether the given electronic coupon is currently valid for the particular kind of use, ceases to inhibit output of the barcode for the particular kind of use if the given electronic coupon is determined to be currently valid for the particular kind of use.

* * * * *